US006769031B1

(12) United States Patent
Bero

(10) Patent No.: US 6,769,031 B1
(45) Date of Patent: Jul. 27, 2004

(54) DYNAMICALLY INCORPORATING UPDATES TO ACTIVE CONFIGURATION INFORMATION

(75) Inventor: Raymond Bero, Bellevue, WA (US)

(73) Assignee: Interland, Inc., Atlanta, GA (US)

( * ) Notice: Subject to any disclaimer, the term of this patent is extended or adjusted under 35 U.S.C. 154(b) by 732 days.

(21) Appl. No.: 09/676,458

(22) Filed: Sep. 29, 2000

(51) Int. Cl.[7] .............................................. G06F 15/16
(52) U.S. Cl. ...................... 709/245; 709/203; 709/217; 709/226; 707/10; 707/202; 707/203
(58) Field of Search ......................... 709/203, 217–219, 709/223, 226–228, 245–246; 707/10, 200–206

(56) References Cited

U.S. PATENT DOCUMENTS

| | | | | |
|---|---|---|---|---|
| 6,009,103 A | * | 12/1999 | Woundy | 709/226 |
| 6,427,170 B1 | * | 7/2002 | Sitaraman et al. | 709/226 |
| 6,434,600 B2 | * | 8/2002 | Waite et al. | 709/245 |
| 6,678,717 B1 | * | 1/2004 | Schneider | 709/203 |
| 6,701,329 B1 | * | 3/2004 | Esibov et al. | 707/201 |

OTHER PUBLICATIONS

U.S. patent application Ser. No. 09/677,440, Bero, filed Sep. 29, 2000.
Register.com/faq/dns.cgi?1 1960898172; DNS (Domain Name Server); May 4, 2000.
Register.com/faq/email.cgi?1 1960898172; Email Address Changes; May 4, 2000.
Register.com/faq/transfer–ownership.cgi?1 1960898172; Transfer Registrant; May 4, 2000.
Register.com/faq/transfer–register.cgi?1 1960898172; Transfer Registrar; May 4, 2000.
Register.com/corporate/corporate–faq.cgi?1 1960898172; Frequently Asked Questions; May 4, 2000.
Firststepsite.com; Build Your Free Web Site in Minutes With Our Easy to Use Site Building Tool; May 4, 2000.
Register.com/index.cgi?1 1960898172; Welcome to Register.com's Domain Manager!; May 4, 2000.
Mydomain.register.com/service.cgi?1 1960898172; URL Forwarding; May 4, 2000.

* cited by examiner

*Primary Examiner*—Bharat Barot
(74) *Attorney, Agent, or Firm*—Perkins Coie LLP

(57) ABSTRACT

A method, system, and computer-readable medium is described for dynamically incorporating updates to configuration information in active use and for providing access to the updated configuration information as appropriate. In some situations, the configuration information being dynamically updated is various types of Domain Name System (DNS) information, including DNS resource records, configuration records, whois records, and delegation records. Depending on the manner in which configuration information is stored and used by a computer, that configuration information can be dynamically updated in different manners. When configuration information is stored in multiple data files and is also cached in memory, an update file can be maintained to indicate the stored data files that have been updated more recently than their corresponding cached information. Alternately, an update file can be maintained for configuration information stored using other storage schemes such as a database, and data structures other than a file can be used to hold the update information.

63 Claims, 16 Drawing Sheets

Example Configuration Data File for the Primary Name Server of the foo.MicronPC.com Zone

| | | |
|---|---|---|
| primary | foo.MicronPC.com | db.foo.MicronPC |
| primary | stanford.edu | db.stanford |
| ⋮ | | |

*FIG. 2A*

Example db.foo.MicronPC Zone Data File for the foo.MicronPC.com Zone foo.MicronPC.com.   IN   SOA   ns1.HostPro.com.   postmaster.HostPro.com.

;;;; information for slave name servers
        1837    ;;; serial number for this version of the zone data file
        1800    ;;; refresh after 30 minutes
        900    ;;; retry after 15 minutes
        86400    ;;; expire after 1 week
        1800    ;;; minimum Time To Live (TTL) of 30 minutes
        )

;;;; name servers for the zone
        IN   NS   ns1.HostPro.com.
        IN   NS   bar ;;;; mail server
        IN   MX   5   mailserver.HostPro.com.

;;;; addresses
   @   IN   A   216.23.39.188
   foo   IN   A   216.23.39.180
   bar   IN   A   216.23.46.83

;;;; aliases
   smtp   IN   CNAME   @
   www   IN   CNAME   @
   ftp   IN   CNAME   foo.foo.MicronPC.com.
   bigdaddy   IN   CNAME   bar

*FIG. 2B*

Example Partial Zone Data File for the MicronPC.com Zone

;;;; delegation of subzone foo.MicronPC.com to authoritative name servers for the subzone
foo   86400   IN   NS   ns1.HostPro.com.
   86400   IN   NS   bar.foo.MicronPC.com.
bar.foo.MicronPC.com.   86400   IN   A   216.23.46.83

*FIG. 2C*

Example DDIU Update File

|     | 363 | 365 |
|-----|-----|-----|
| 362 | <path-1>/db.foo.MicronPC | modified |
| 364 | <path-2>/db.foo.MicronPC | modified |
| 366 | <path-3>/db.abcd | deleted |

*FIG. 3B*

DYNAMICALLY INCORPORATING UPDATES TO ACTIVE CONFIGURATION INFORMATION

TECHNICAL FIELD

The following disclosure relates generally to updating information, and more particularly to dynamically incorporating updates to configuration information in active use.

BACKGROUND

The Internet enables a user of a client computer system to identify and communicate with millions of other computer systems located around the world. A client computer system can identify each of these other computer systems using a unique numeric identifier for that computer called an "IP address." When a communication is sent from a client computer system to a destination computer system, the client computer system typically specifies the IP address of the destination computer system in order to facilitate the routing of the communication to the destination computer system. For example, when a request for a World Wide Web page ("web page") is sent from a client computer system to a web server computer system ("web server") from which that web page can be obtained, the client computer system typically includes the IP address of the web server.

In order to make the identification of destination computer systems more mnemonic, a Domain Name System (DNS) has been developed that translates a unique textual name for a destination computer system into the IP address for that computer. The textual name is called a "domain name." For example, the domain name for a hypothetical computer system operated by Micron Electronics, Inc. ("Micron Electronics") may be "comp23.MicronPC.com". Using domain names, a user attempting to communicate with this computer system could specify a destination of "comp23.MicronPC.com" rather than the particular IP address of the computer system (e.g., 198.81.209.25).

In addition to making the identification of destination computer systems more mnemonic, domain names introduce a useful layer of indirection between the name used to identify a destination computer system and the IP address of that computer system. Using this layer of indirection, the operator of a particular computer system can initially associate a particular domain name with a first computer system by specifying that the domain name corresponds to the IP address of the first computer system. At a later time (e.g., if the first computer system breaks or must be replaced), its operator can "transfer" the domain name to a second computer system by then specifying that the domain name corresponds to the IP address of the second computer system.

The domain names in DNS are structured in a hierarchical, distributed database that facilitates grouping related domain names and computers, as well as facilitating the uniqueness of different domain names. In particular, as mentioned above, a particular domain name such as "MicronPC.com" may identify a specific host computer. However, the hierarchical nature of DNS also allows a domain name such as "MicronPC.com" to represent a domain including multiple other domain names each identifying computers (also referred to as "hosts"), either in addition to or instead of identifying a specific computer. FIG. 1A illustrates a hypothetical portion of the DNS database 100 in which the node representing the Micron-PC.com domain name 110 is the root node in an Micron-PC.com domain 150 that includes 7 other nodes each representing other domain names. Each of these domain names in the MicronPC.com domain can be, but do not have to be, under the control of a single entity (e.g., Micron Electronics). FIG. 1A also includes a HostPro.com domain 155 that includes a single domain name.

As is illustrated, the DNS database can be represented with a tree structure, and the full domain name for a given node in the tree can be determined by concatenating the name of each node along the path from the given node to the root node 101, with the names separated by periods. Thus, the 8 nodes in the MicronPC.com domain represent the domain names MicronPC.com 110, foo.MicronPC.com 112, bar.MicronPC.com 114, comp23.MicronPC.com 116, foo..foo.MicronPC.com 118, bar.foo.MicronPC.com 120, abc.comp23.MicronPC.com 122, and cde.comp23.MicronPC.com 124. Other domain names outside the MicronPC.com domain are also illustrated in FIG. 1A, including BCD-Corp.com 132 and HostPro.com 134 in the ".com" domain (whose boundary is not illustrated in FIG. 1A) and Stanford.edu 136 and Berkeley.edu 138 in the ".edu" domain (whose boundary is not illustrated in FIG. 1A). The hierarchical nature of the domain names also assist in maintaining uniqueness of names—for example, while the domain names for nodes 112 and 118 each have the same text label of "foo," their full domain names are distinct.

The hierarchical, distributed structure of DNS additionally assists in the mapping of the textual domain names to the appropriate IP addresses. In particular, DNS is supported by a network of domain name server computer systems ("domain name servers") distributed throughout the Internet that maintain mappings from domain names to IP addresses. For any particular domain name, at least one domain name server is designated as being authoritative for that particular domain name and can determine one or more IP addresses to which the particular domain name should be mapped. When another computer requests the one or more IP addresses for a domain name, an authoritative domain name server for that domain name can then make the appropriate IP addresses available to the requestor. A piece of software that is commonly used to implement the DNS protocols is the Berkeley Internet Name Domain ("BIND") software, available at the time of this writing at "http://www.isc.org/products/BIND/". This software assists authoritative domain name servers to maintain the appropriate mapping information for domain names, and also assists other computers in identifying the domain name servers that are authoritative for a domain name when needed.

Each domain name will have one authoritative name server that is designated as the primary master name server ("primary name server") for that domain name, and the primary name server will have control over the stored information (including the IP addresses) for that domain name. In particular, the information about the domain name will typically be stored as a local file on the primary name server computer (called a "zone data file," as discussed below), and the primary name server will thus control any changes that are to be made to the domain name information. If there are additional non-primary name servers that are authoritative for the domain name, these name servers are referred to as "slave name servers." When a primary name server begins to execute, it typically reads the information from each zone data file that is stored and then caches that information in its memory for quick access. Slave name servers obtain their domain name information from the appropriate primary name server (typically when they begin to execute), and can then make the information available to requestors.

Rather than being associated directly with domain names, each name server is actually associated with one or more zones of domain names, with each zone including one or more related domain names. Various information about each zone is stored in a zone data file for that zone, including information indicating the primary name server for the zone, slave name servers for the zone, domain name-to-IP address mappings for each domain name in the zone, domain name aliases that represent other domain names in the zone, and a serial number indicating a version of the zone data file. A primary or slave name server for a zone can be a host computer associated with one of the domain names in the zone, or can instead be associated with a domain name located elsewhere in the DNS database hierarchy. Each entry in the zone data file is referred to as a DNS resource record.

FIG. 1B illustrates an example of the distinction between domains and zones. As discussed above, the MicronPC.com domain includes 8 domain names, but as is illustrated, this domain is divided up in this example into 3 different zones. In particular, the MicronPC.com zone 170 contains the MicronPC.com, comp23.MicronPC.com, abc.comp23.MicronPC.com, and cde.comp23.MicronPC.com domain names. The other 4 domain names have been assigned to different zones, with the bar.MicronPC.com domain name being located in the bar.MicronPC.com zone 165 and the other three domain names being located in the foo.MicronPC.com zone 160. Such zone divisions could be implemented for a variety of reasons, such as for ease of administration if the computers associated with the domain names in each of the zones are at different physical locations or are part of different organizations within the Micron Electronics. As described above, a primary name server for a zone can be a computer whose domain name is not within the zone. Thus, for example, while the MicronPC.com computer may be the primary name server for the MicronPC.com zone in FIG. 1B and the bar.MicronPC.com computer may be the primary name server for the bar.MicronPC.com zone, the HostPro.com computer could be the primary name server for the foo.MicronPC.com zone (and thus store the zone data file for the foo.MicronPC.com).

Thus, when a client computer wants to communicate with a computer supporting a domain name, the client can request the appropriate IP address for the domain name computer from one of the authoritative name servers for the zone that includes the domain name, and the name server can then provide the IP address to the client. However, in order to obtain information about a domain name, the client computer needs to be able to identify the authoritative name servers for the domain name. DNS resolves domain name requests in a hierarchical manner. One or more root name servers maintain information about the authoritative name servers for each of the top-level domains (e.g., ".com" and ".edu"). Those authoritative name servers can then provide information about the authoritative name servers for domains at a next level lower in the hierarchy—for example, an authoritative name server for the ".com" domain will know the authoritative name servers for the MicronPC.com domain. Continuing in this hierarchical manner, the authoritative name servers for the domain name of interest can be identified.

Each name server maintains information on each of the zones for which it is the primary name server or a slave name server. In particular, most name servers maintain a configuration file that lists each zone and the zone data file for that zone. FIG. 2A provides one example of a configuration file for the name server that is the primary name server for the foo.MicronPC.com zone, as is indicated in line 205 of the file. As is shown in the first DNS configuration record, the zone data file for the foo.MicronPC.com is named "db.foo.MicronPC". The name server is also shown to be the primary name server for the stanford.edu zone in the second DNS configuration record. Thus, when this name server begins to execute, it will read each of the listed zone data files to obtain the zone information for its zones. Those skilled in the art will appreciate that different formatting may be used for the configuration file in different situations, such as for different versions of the BIND software.

FIG. 2B illustrates an example of a possible db.foo.MicronPC zone data file for the foo.MicronPC.com zone. As those skilled in the art will appreciate, the second and third DNS resource records in the zone data file indicate that a computer with the domain name ns1.HostPro.com (not illustrated in FIGS. 1A and 1B) is the primary name server for the foo.MicronPC.com zone and that a computer with the bar.foo.MicronPC.com domain name is a slave name server, and other DNS resource records include a variety of other information about the foo.MicronPC.com zone.

As mentioned above, an authoritative name server for a zone maintains information on the authoritative name servers for subzones of the zone. Thus, the authoritative name servers for the MicronPC.com zone need to maintain information to allow them to delegate requests about the foo.MicronPC.com subzone to the primary and slave name servers for the subzone, ns1.HostPro.com and bar.foo.MicronPC.com respectively. The zone data file for the MicronPC.com zone could include the additional entries illustrated in FIG. 2C to delegate requests about the foo.MicronPC.com zone to the ns1.HostPro.com and bar.foo.MicronPC.com domain names.

In addition to the technical information that is present in the zone data files, additional administrative information is also maintained for some domain names by the registrars for those domain names. This administrative information, also referred to as "whois data" or a DNS whois record, identifies the current administrative contact for the domain name, and can include additional information such as the "registrant" (i.e., owner) of the domain name, when the domain name was first created and when the administrative information was last modified. A registrar is a company that assigns new domain names to applicants and registers the new domain names in a central registry. If a registrar for a new domain name also acts as the primary name server for a zone including that domain name, the registrar will maintain for that domain name both the technical DNS information in its zone data file and the administrative whois DNS information.

Additional details about DNS and the BIND software are available in "DNS and BIND, Third Edition" by Paul Albitz & Cricket Liu, 1998, O'Reilly & Associates Publishing, Sebastopol, Calif. 95472, which is hereby incorporated by reference in its entirety.

As described above, a computer with a domain name that is outside of a zone can serve as a primary name server for the zone. In fact, a company such as web hosting company HostPro, Inc. ("HostPro") may provide a service to other companies in which a HostPro computer will serve as the primary name server for a zone having domain names that are mapped to computers controlled by those other companies (e.g., computers that are located at those companies' sites). Alternately, HostPro may perform a similar service as a primary name server for a zone with domain names for another company that are mapped to computers that are controlled by HostPro (e.g., computers that are located at a HostPro site). In either situation, as the primary name server, the HostPro computer would store and maintain a zone data file for the zone. A company such as HostPro could also provide a variety of types of services to other companies, such as web hosting services (e.g., providing disk space for the company's web pages or processing capabilities to handle requests for those web pages), email hosting services (e.g., providing processing capabilities to forward email that is received for the domain or disk space to store received email messages), application service provider services (e.g., providing disk and processing capabilities to execute an application on behalf of a another device such as a client computer of the company), connectivity service (e.g., an Internet Service Provider (ISP) that provides access to the Internet), etc. In addition, HostPro could serve as a registrar that registers domain names for other companies.

Unfortimately, DNS information can change frequently, and various problems exist with updating the necessary records to ensure that up-to-date information is provided in response to requests. One way in which DNS information changes is that users (e.g., system administrators) may often want to make changes to information in an existing zone data file. These changes could be to modify any of the information in the zone data file, such as to add information about new domain names added to the zone, to remove information about domain names removed from the zone, to change a name server for the zone, or to change other configuration information for the zone. Alternately, the user may wish to change the IP address to which a domain name is mapped. Even if the user has control over the primary name server for the zone and can directly edit the zone data file, the strict formatting requirements for zone data files can make the revision process error-prone. The situation is exacerbated when the user does not have control over the zone data file (e.g., the primary name server computer is located remotely or is under the control of another entity), and must send requests for changes to some other user.

In addition to modifying existing zone data files, DNS information for a primary name server can change when zone data files are added or removed. This can occur frequently for some primary name servers. For example, a primary name server that is maintained by a registrar for other companies may get a new zone data file for every company that registers one or more domain names with the registrar. In addition, companies that already have a registered domain name may change the company that is responsible for managing their domain name, thus causing the primary name server for the zone containing their domain name to change. When these types of changes occur, the primary name servers need to have their information modified so that they provide appropriate up-to-date information to requests. In addition, other computers (e.g., root name servers for the DNS database) need to have their information updated so that they can identify the primary name server for a newly created domain name or a domain name being managed by a new company.

While changes to zone information and zone data files can frequently occur, these changes create problems for primary name servers. In particular, as noted above, a primary name server generally reads its zone data files at startup, and then uses the information stored in memory. Thus, changing data in a zone data file or adding a new zone data file will not necessarily cause the primary name server to be aware of the new information—in some situations, the primary name server will not detect the new information until the primary name server is halted and restarted. In other situations, the primary name server may check for changes to its zone data files only occasionally, such as once a day. Thus, while changes to a zone data file may have been made or new zone data files may have been added, such as to reflect physical changes that have occurred in the network, the changed information may not be used by the primary and slave name servers for a lengthy period of time. This means that the domain name information being provided by the authoritative name servers may not reflect the physical reality of the computers on the Internet (e.g., if a computer to whom a domain name was previously mapped is no longer available, or a computer mapped to a new domain name is available but requestors cannot determine that a computer for the domain name is available).

One possible solution to the delay in primary name servers becoming aware of the changes to their zone data files is for primary and slave name servers to not cache zone data file information in memory. In this situation, each time that one of the primary or slave name servers receives a request for zone information contained in one of the zone data files, the primary name server would read the appropriate zone data file to retrieve the information. Unfortunately, the amount of time required to read a zone data file from a hard disk is so long that this solution is not workable.

Another possible solution to the delay in primary name servers becoming aware of the changes to their zone data files is for a primary name server to periodically update its cached information in memory. In particular, at regular intervals the primary name server could obtain the current zone information in its zone data files in one of several ways, such as by re-reading each zone data file, or by checking each zone data file to see if it has changed (e.g., by reading a file to determine if the serial number of the file has changed, or by accessing information about the time of the last modification of the file) and then re-reading only those changed files. Similarly, in order to detect new zone data files, the primary name server could re-read its configuration file and compare it to a previous version or to cached information in order to determine if a currently listed zone data file has not been read or if a previously read zone data file is no longer listed. A problem with this solution is that during this process of updating the zone information, the primary name server is not available to respond to requests about the zone information, and thus a client computer attempting to access a domain name in the zone may be unable to contact the available computer for that domain name because the client cannot determine the appropriate IP address for the computer. Despite this problem with lack of availability, re-reading of zone data file information may be used by primary name servers with a very small number of zone data files (e.g., less than 10) as the least problematic solution to the problem of changing DNS information.

Unfortunately, this re-reading of zone data file information from the configuration file and zone data files becomes increasingly unworkable as the number of zone data files associated with a primary name server increases. Moreover, some primary name servers can have very large numbers of associated zone data files, ranging from thousands to even millions of such zone data files. However, a primary name server trying to re-read zone data file information for such large numbers of zone data files may take 15–30 minutes or even longer to perform this task, with the primary name server unable to respond to domain name mapping requests or other zone information requests during that time. One example of a primary name server having a very large number of associated zone data files would be one maintained by a company such as HostPro that acts as a registrar or provides some type of zone management or hosting service for other companies. For example, the register.com company (www.register.com) currently indicates that it has registered over 1 million domain names for other companies.

Thus, a need exists for a way that primary name servers can more efficiently and rapidly detect and incorporate changes to zone information in their zone data files. In addition, there is a need to provide an easy way for users to modify DNS information for their domain names, particularly when the information is maintained by a computer that is not under their direct control.

BRIEF DESCRIPTION OF THE DRAWINGS

FIGS. 2A–2C are examples of DNS data files.

FIG. 3B is an example embodiment of a Dynamic DNS Information Updating (DDIU) Update file.

DETAILED DESCRIPTION

Figure 1A:
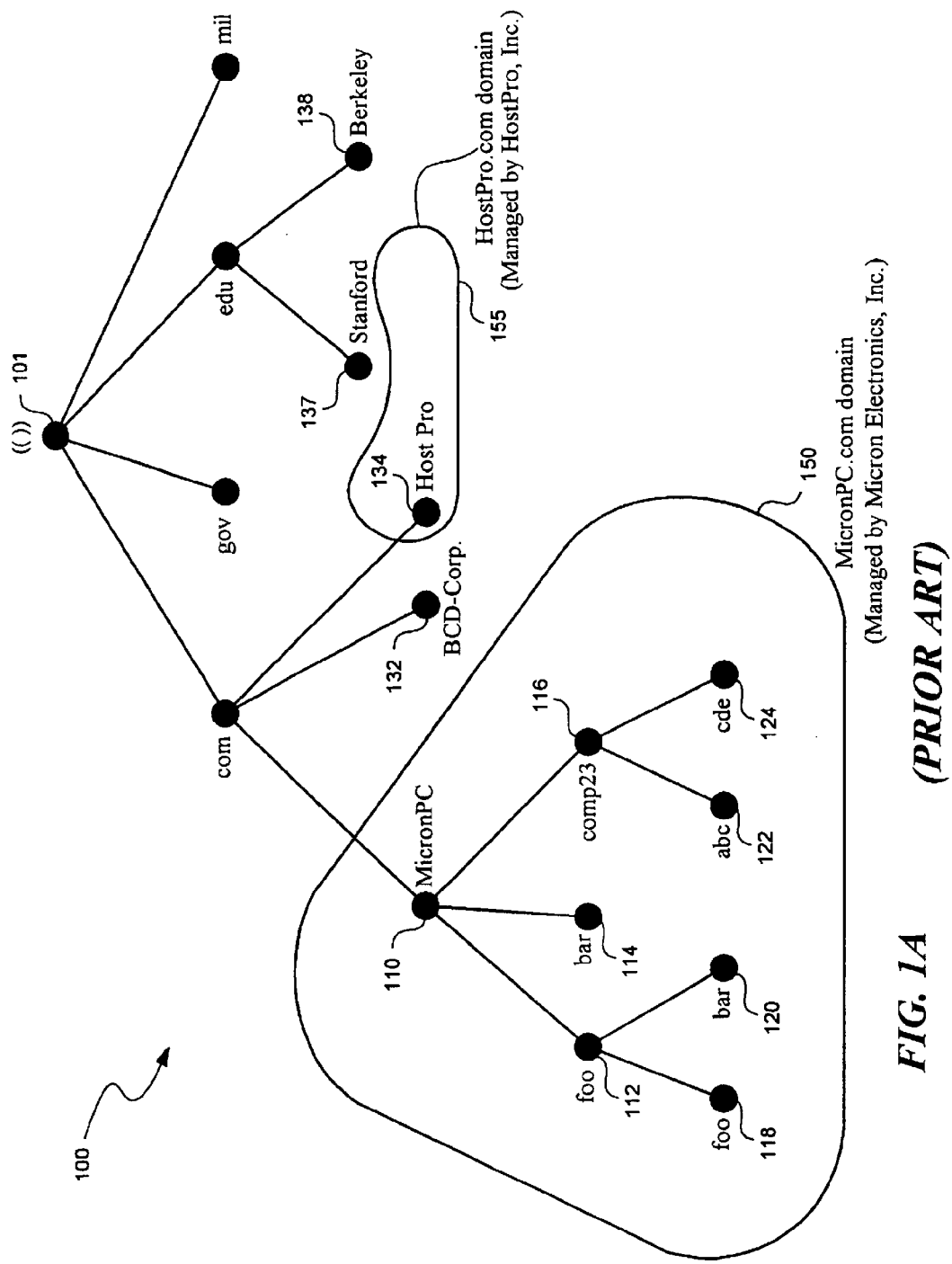
FIGS. 1A and 1B are network diagrams illustrating interconnected network devices and Domain Name System (DNS) information.
Figure 1B:
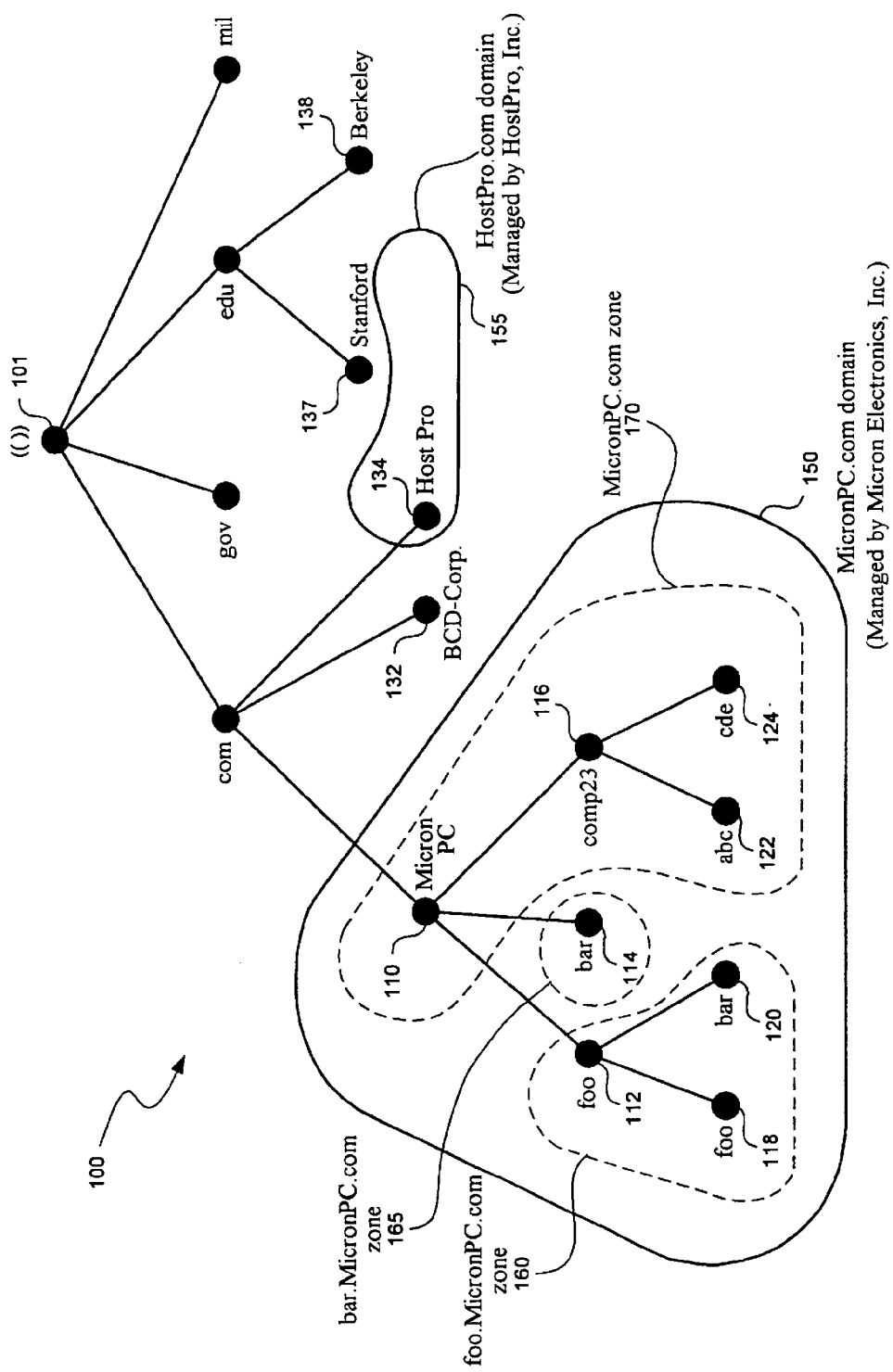

A software facility is described below that dynamically incorporates updates to configuration information in active use, and that provides access to the updated configuration information as appropriate. In some embodiments, an update file or other update data structure is used to track various changes that are made to the configuration information and to indicate when different copies of the configuration information need to be synchronized, as described in greater detail below. In addition, in some embodiments a graphical user interface (GUI) is provided to allow a user to view current configuration information and to specify updates to the configuration information, with the specified updates being dynamically incorporated.

For illustrative purposes, some embodiments of the software facility are described below in which Domain Name System (DNS) information is dynamically updated (e.g., based on requests sent by the customers that own or administer domain names corresponding to the DNS information) and is provided to requesting clients. However, those skilled in the art will appreciate that the techniques of the invention can be used in a wide variety of other situations, some of which are discussed below, and that the invention is not limited to the updating of DNS information.

In particular, the Dynamic DNS Information Updating (DDIU) system is an example embodiment of the software facility in which DNS information is dynamically updated while in active use by other client devices in need of the DNS information (e.g., for the mapping information of domain names to IP addresses). The DDIU system can be used by computer systems that provide access to DNS information, including primary and slave name server computers and registrars' computers that store whois data. Depending on the manner in which the DNS information is stored and used by a computer, different embodiments of the system dynamically update active DNS information for that computer in different manners.

A user's ability to interactively update configuration information, such as via a GUI, can provide significant benefits in a wide variety of situations. For example, a customer of a company may desire to view and edit various information about their account that can be provided by a computer of the company, such as administrative or billing information. Similarly, a variety of types of companies may maintain DNS information for customers, such as DNS registrar companies, companies providing computer connectivity, and companies providing computer hosting services (e.g., web hosting, email hosting, or application hosting). A customer of such a company may benefit from the ability to have their DNS information dynamically updated, whether the customer interactively updates the information (e.g., remotely over the Web in a visual manner) or a company dynamically updates the information for the user as part of a service being provided to the user. Various benefits of dynamically updating configuration information are discussed in greater detail below.

Figure 3A:
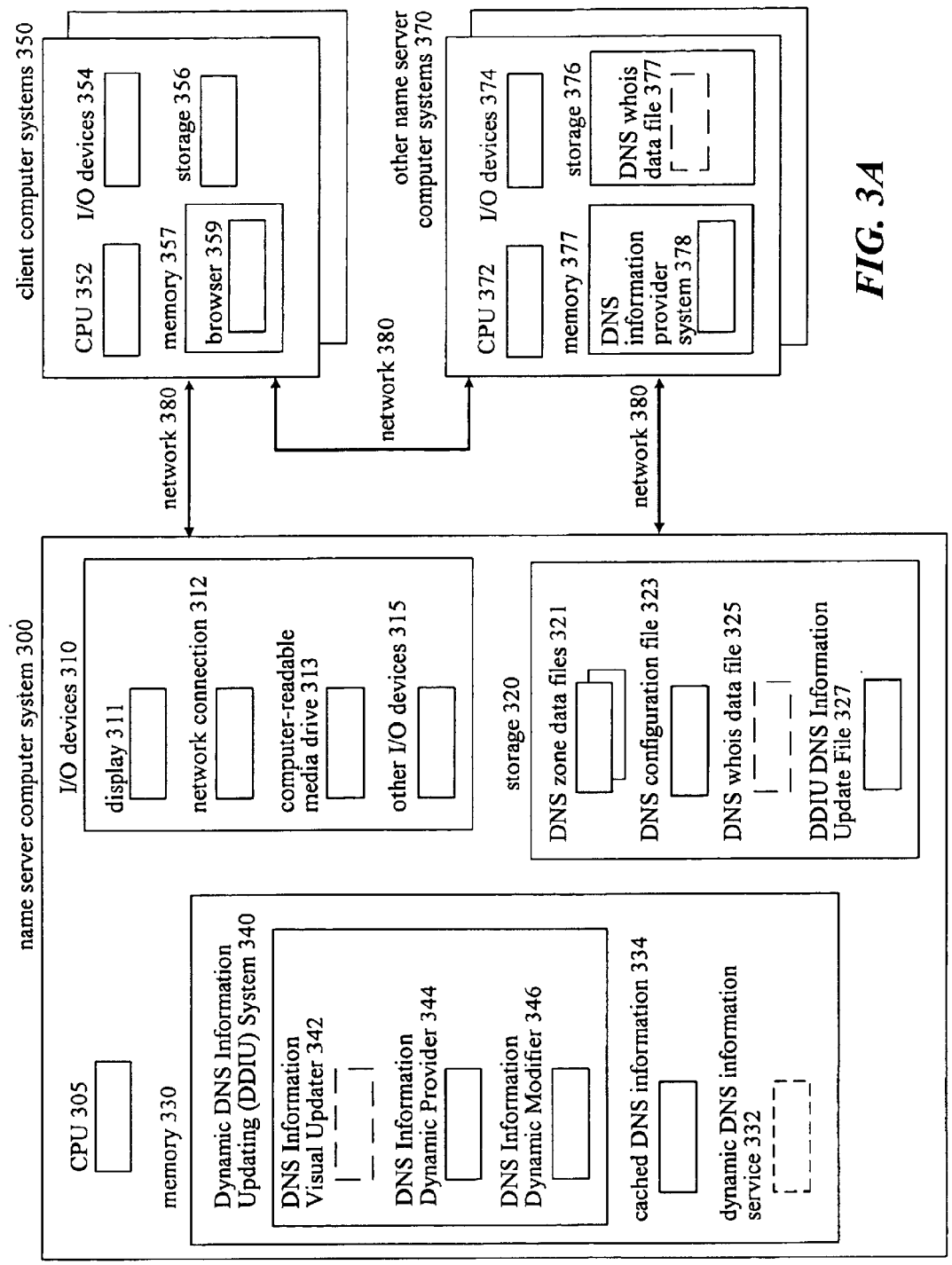
FIGS. 3A and 3C are each block diagrams illustrating an embodiment of the disclosed Dynamic DNS Information Updating system.

FIG. 3A illustrates a name server computer system 300 suitable for executing an embodiment of the DDIU system 340, various client computer systems 350 from which users can access the DDIU system, and various other computer systems 370 that provide access to other distributed DNS information. The name server computer system 300 includes a CPU 305, various I/O devices 310, storage 320 (e.g., a hard drive), and memory 330. The I/O devices include a display 311, a network connection 312, a computer-readable media drive 313, and other I/O devices 315.

The DDIU system is executing in memory, and it includes a DNS Information Dynamic Modifier component 346, a DNS Information Dynamic Provider component 344, and optionally a DNS Information Visual Updater component 342. The DNS Information Dynamic Provider component receives requests for DNS information from users or executing software, and provides an up-to-date version of the requested DNS information in response to a request. The DNS Information Dynamic Provider component is assisted by the DNS Information Dynamic Modifier component, which receives updates to DNS information, dynamically modifies the stored permanent versions of the DNS information to reflect the updated DNS information, and ensures that the updated DNS information is dynamically available (e.g., immediately, or within a very short time such as minutes) to the DNS Information Dynamic Provider component.

In some embodiments, the DNS Information Dynamic Modifier and DNS Information Dynamic Modifier components allow users or executing software to register new domain names, including optionally specifying various DNS information for the domain names, and the DNS Information Dynamic Modifier component dynamically modifies the stored DNS information to reflect the updated DNS information and ensures that the updated DNS information is dynamically available to the DNS Information Dynamic Provider component. In addition, the components may in some embodiments generate some or all of the DNS information for the new domain name, such as by adding mapping information to a primary name server computer provided by a registrar executing the components or by using default DNS information records.

If present, the DNS Information Visual Updater component interacts with both of the other DDIU components. In particular, the DNS Information Visual Updater component receives requests from users to display DNS information, retrieves the indicated DNS information from the DNS Information Dynamic Provider component, and displays the retrieved information to the user. If the user wishes to modify the displayed DNS information (e.g., to change or remove existing DNS information or to add new DNS information), the user can indicate the modification to be made (e.g., via a GUI provided by the component) and the DNS Information Visual Updater component then notifies the DNS Information Dynamic Modifier component of the modifications.

In some embodiments, the DNS Information Visual Updater component provides Web pages to users that include selectable items such that selection of the item causes an update to the DNS information to be communicated to the DNS Information Dynamic Modifier component. If the DNS Information Dynamic Modifier and DNS Information Dynamic Modifier components allow users to register new domain names, the DNS Information Visual Updater component may additionally provide Web pages to users that include user-editable fields to specify a new domain name and optionally various DNS information associated with the domain name, as well as one or more selectable items that cause a request to register the user-specified domain name with the optionally supplied DNS information to be communicated to the DNS Information Dynamic Modifier component.

In some embodiments, one or more of the DDIU system components may also provide various other functionality, such as restricting access to some or all of the DNS information for particular domain names unless a user is determined to be authorized for the type of access requested. Thus, a user may not be allowed to view some or all of the DNS information for a specified domain name unless they are the owner or the administrative contact for the domain name, or a user may be allowed to view the DNS information but not modify it unless they are one of a group of users designated to be authorized to make such modifications. In addition, the components may be able to provide information to users about a variety of services available to be provided by one or more companies, receive requests from users to provide such services, and either notify the companies of the requests or directly fulfill the requests. One or more of the components could also receive payment information from the user for performing the requested update of the DNS information or for providing another requested service.

In addition to the DDIU system, one or more optional dynamic DNS information service modules 332 can also be executing in memory 330 or in the memory of another accessible computer (not illustrated). Such information service modules can use the DDIU system's ability to dynamically update DNS information in order to provide other useful services to users. For example, a particular computer may have a type of network connection that assigns the computer different IP addresses at different times, such as a DSL connection for a home computer or Dynamic Host Configuration Protocol (DHCP) provided on a company's intranet. If so, a particular dynamic DNS information service module may provide the service of updating the mapping information in the DNS resource record for a static domain name so that the domain name is always associated with the current IP address assigned to the computer. In this manner, the computer can provide a Website associated with the domain name, and the Website will always be accessible to other users. Conversely, it may be useful to update some other type of DNS information on a predefined schedule, and if so, a dynamic DNS information service module can update the DNS information as needed to comport with the schedule. Various dynamic DNS information services modules are discussed in greater detail below.

The various DDIU components may be accessed by users and software in a variety of ways and for a variety of reasons. For example, some users may have physical access to the name server computer system, and may thus be able to access the DDIU components via the I/O devices 310. Alternately, other users can use the I/O devices 354 and software (e.g., the browser 362 executing in memory 360) that are provided by one of the client computer systems to remotely access the components of the DDIU system (e.g., via the Internet and/or the World Wide Web). Such user-initiated accesses can be either intentional (e.g., the user directly requests the DNS Information Dynamic Provider component to provide DNS information), or a by-product of some other user activity (e.g., the user instructs the browser to display a specified domain name, and the browser in turn requests the DNS Information Dynamic Provider component to provide the IP address corresponding to the domain name).

In addition to user-initiated accesses of the DDIU components, the components can also receive information or requests from other executing software or computers that are not acting under explicit user instructions. For example, DNS software on other name server computer systems 370 (e.g., a DNS information provider system 378 executing in memory 377, such as a copy of BIND software) may supply updated DNS information to the DNS Information Dynamic Modifier component or send requests for DNS information to the DNS Information Dynamic Provider component. Similarly, non-DNS software (not illustrated) may supply DNS information or send requests to the DDIU components.

As indicated above, the DNS Information Dynamic Provider component provides up-to-date DNS information to requesters. However, determining whether the DNS information that is most readily available to the DNS Information Dynamic Provider component is up-to-date is complicated by situations in which that DNS information has been temporarily cached in memory. As described previously, if a stored portion of DNS information has been updated after the stored portion of DNS information is cached, then the cached version of the DNS information portion will not be the most recent version. To prevent the DNS Information. Dynamic Provider component from having to do labor-intensive checking of each stored portion of DNS information to determine if it has been updated (e.g., by tracking and checking the dates of the most recent modification of the stored portion or by rereading the contents of each stored portion of DNS information), the DNS Information Dynamic Modifier component instead ensures that the DNS Information Dynamic Provider component can easily determine whether any DNS information has been updated. The DNS Information Dynamic Modifier component can provide this service in a variety of ways, as discussed below.

In the embodiment illustrated in FIG. 3A, various DNS information is stored in multiple DNS information files on a storage device 320, including DNS zone data files 321, a DNS configuration file 323, and optionally a DNS whois data file 325. If the name server computer 300 is the computer that is used to provide the whois data for the domain names, then the DNS whois data file will be stored on or otherwise accessible to the name server computer. Alternately, if another computer (e.g., one of the other name server computer systems) is instead the whois computer of the registrar for the domain names in the zone data files, then that other computer will store the DNS whois data file (e.g., DNS whois data file 377 on storage 376).

In the illustrated embodiment, the DDIU system maintains information about recent DNS information updates in a DDIU DNS Information Update File 327 (also referred to as the "Update file" or "update file"). In particular, when the DNS Information Dynamic Modifier component receives updated DNS information, the component not only updates the appropriate DNS file containing the stored DNS information to include the updated DNS information, but also modifies the Update file so that it indicates that the updated DNS information is available (including creating the Update file if it does not exist). The Update file can indicate that the updated DNS information is available in a variety of ways, such as by including a unique identifier for each DNS information file that has been updated, by including the updated DNS information, or by including an indication of the particular records in the DNS information files (e.g., a DNS resource record in a zone data file) that have been updated. If multiple updates of DNS information occur, the Update file can include a corresponding entry for each update.

FIG. 3B illustrates an example embodiment of a Dynamic DNS Information Updating (DDIU) Update file having three entries 362, 364 and 366. As is illustrated, each entry includes an indication 363 of a DNS information file that has been updated and an indication 365 of a type of updating that has occurred. Those skilled in the art will appreciate that other embodiments of the Update file may have additional information or may lack illustrated information, such as not including the indications 365 of the type of updating.

If an Update file is being used to indicate when updated DNS information is available, the DNS Information Dynamic Provider component will check the Update file to determine whether cached DNS information (e.g., cached DNS information 334 in memory 330) needs to be updated. The determination of whether the Update file indicates that updated DNS information is available can occur in various ways, such as by determining whether the Update file exists (if it is present only when DNS information has been updated since it was last cached), by determining whether the modification date or size of the Update file has changed since the last check of the Update file, by reading the Update file contents, etc. The decision of when the Update file is to be checked can similarly occur in a variety of ways. For example, the DNS Information Dynamic Provider component can periodically check the Update file on a frequent basis (e.g., every minute), can check the Update file when instructed to do so by a user, can check the Update file before fulfilling each request for DNS information, or can check the Update file if notified that it has been modified (e.g., by the DNS Information Dynamic Modifier component).

When the check of the Update file indicates that updated DNS information is available and that there are multiple DNS information update entries indicated in the Update file, the DNS Information Dynamic Provider component can perform the corresponding update for each entry or instead for only selected entries (e.g., if an entry corresponds to currently requested DNS information, updating only for that entry). The updating occurs by reading the stored DNS information files indicated (or reading the updated DNS information itself if it is present in the Update file) and replacing the previously cached information that corresponds to the read DNS information with the read DNS information. In this manner, the cached DNS information will be updated to match the updated stored DNS information. After the updating for an entry occurs, the DNS Information Dynamic Provider component will in most embodiments modify the Update file so that it no longer contains that entry—thus, if updating occurs for all of the entries, the Update file can either be left empty or can be deleted.

Use of the Update file in the illustrated embodiment thereby allows the DNS Information Dynamic Modifier component to easily indicate the DNS information that has been updated, and allows the DNS Information Dynamic Provider component to quickly determine whether DNS information has been updated without having to reload every stored DNS information file or to perform labor-intensive checking of each stored DNS information file to determine if it has been updated. Such an Update file is particularly useful when large numbers of stored DNS information files are present, such as thousands or hundreds of thousands of such files.

Those skilled in the art will appreciate that while an Update file is used in the illustrated embodiment to contain the update information, in other embodiments other Update data structures could be used to serve a similar purpose. For example, an array having at least one entry for each stored portion of DNS information could be used such that when a stored portion of DNS information is updated more recently than the cached information corresponding to it, the corresponding entry is updated to indicate that the DNS information has been updated. Conversely, a linked list could be used having entries dynamically added for each set of DNS information that is updated. A variety of other Update data structures could be similarly employed.

Those skilled in the art will also appreciate that the use of an Update file or other update data structure will be beneficial in situations other than when configuration information is being cached in memory. In particular, such an Update file or update data structure can be used any time that multiple copies of any kind of information are being maintained and it is desirable for at least some of the copies to be kept consistent with other copies.

Similarly, those skilled in the art will appreciate that computer systems 300, 350, and 370 are merely illustrative and are not intended to limit the scope of the present invention. Computer system 300 may be connected to other devices that are not illustrated, including through one or more networks such as the Internet or via the World Wide Web (WWW). In addition, the functionality provided by the illustrated DDIU system components may in some embodiments be combined in fewer components or distributed in additional components. Similarly, in some embodiments the functionality of some of the illustrated components may not be provided and/or other additional functionality may be available. For example, while the illustrated DDIU system includes a DNS Information Dynamic Provider component that provides DNS information in response to client requests, in other embodiments clients may directly retrieve such information and thus an information providing component would not be needed. Conversely, while only a single Update file is illustrated, multiple Update files could instead by used (e.g., one Update file for each data file or for each type of DNS information).

Those skilled in the art will also appreciate that, while the components of the DDIU system and the dynamic DNS information service modules are illustrated as being stored in memory while being used, these items or portions of them can be transferred between memory and other storage devices for purposes of memory management and data integrity. Similarly, while the various stored DNS information files and the Update file are illustrated as being present on storage while being used, those skilled in the art will appreciate that these items, or portions of them, can instead be present in memory and transferred between storage and memory. In addition, some or all of the DNS information could be stored using a storage mechanism other than files, such as a database. The DDIU components may also be stored as instructions on a computer-readable medium, such as a hard disk, a memory, or a portable article to be read by an appropriate drive. Similarly, the data structures of the DDIU system may also be stored on a computer-readable medium, such as the Update file and/or the various DNS information files. The DDIU system instructions and data structures can also be transmitted as generated data signals on a variety of computer-readable transmission mediums, including wireless-based and wired/cable-based mediums. Accordingly, the present invention may be practiced with other computer system configurations.

In some embodiments, a client system communicates with a server system in order to send HTTP requests and receive Web pages from the server. The client system can use a browser to send and receive HTTP messages and to display Web pages. One skilled in the art will appreciate that the techniques of the DDIU system can be used in various environments other than the Internet. Also, various communication channels may be used, such as a local area network, a wide area network, or a point-to-point dialup connection. In addition, a server system may comprise any combination of hardware or software that can provide DNS information. Similarly, a client system may comprise any combination of hardware or software that can interact with the server system. These systems may include television-based systems or various other consumer products through which orders may be placed. In addition, while Web pages are often constructed using HTML, other methods can be used to create such pages, such as Java, XML, HDML, WML, CGI scripts, etc. Similarly, communication protocols other than HTTP can be used, such as WAP, TCP/IP, or FTP, as well as a variety of inter-device communication mechanisms, including CDPD, CDMA, GSM, PDC, PHS, TDMA, FLEX, ReFLEX, iDEN, TETRA, DECT, DataTAC, Mobitex, etc. Both the client and the server system can also operate on a wide variety of operating system types (e.g., Windows, Linux, Unix, MacOS, BEOS, PalmOS, EPOC, Windows CE, FLEXOS, OS/9, JavaOS, etc.), and need not share the same operating system.

Figure 3C:
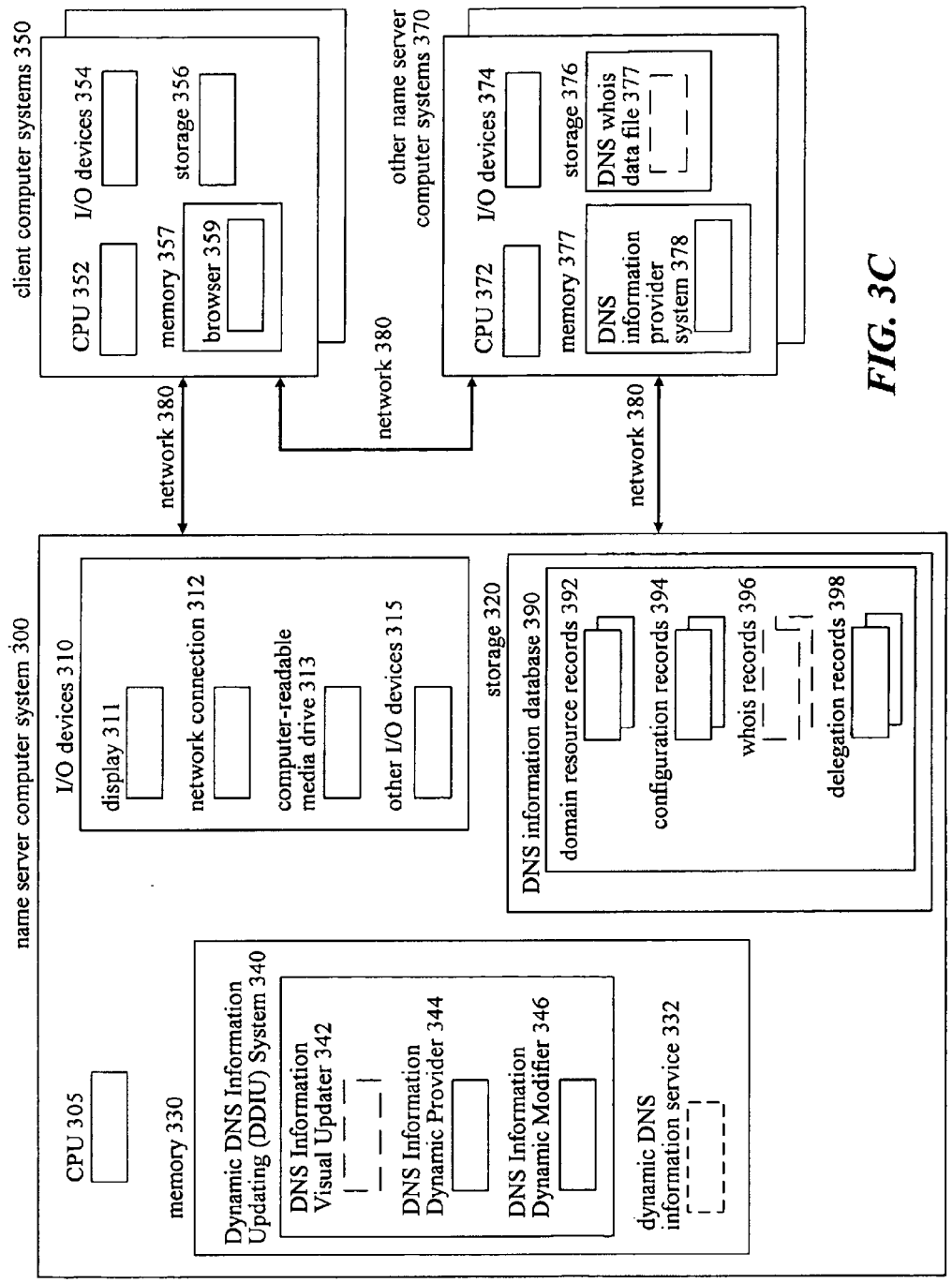

FIG. 3C illustrates an embodiment of the DDIU system 340 similar to that illustrated in FIG. 3A, but in this embodiment the various DNS information is stored in a DNS information database 390 rather than in files. The database contents include domain resource records 392, configuration records 394, delegation records 398, and optionally whois records 396. Those skilled in the art will appreciate that if the various DNS information is stored in a DNS information database rather than in data files, in some embodiments the configuration records in a configuration file may not be included in the DNS information database. Since the primary purpose of the configuration file is to identify the zone data files that are present (and thus the corresponding zones), in some embodiments this information could be directly determined from the DNS information database by examining the various domain resource records. In other embodiments such as is illustrated, however, configuration records may be maintained in the DNS information database, such as by having each configuration record indicate the various domain resource records that correspond to a particular zone.

In the illustrated embodiment, database access is sufficiently rapid that the DNS information retrieved from the database is not cached by any of the DDIU system components. Thus, each time that a piece of DNS information is needed (e.g., to respond to a client's request), the DNS information is retrieved from the database. Therefore, dynamically updating DNS information in this embodiment merely entails updating the appropriate database records, as the updated information in those records will be used the next time the information is needed. In this embodiment, when the DNS Information Dynamic Modifier component receives updated DNS information, it updates the appropriate database records to include the updated DNS information. To ensure that DNS information to be provided is up-to-date, the DNS Information Dynamic Provider component merely retrieves the DNS information from the appropriate database records.

If the embodiment illustrated in FIG. 3C was altered so that DNS information retrieved from the database was cached, however, an Update file (not shown) or other update data structure (not shown) could be used in a manner similar to that discussed above to ensure that the DNS Information Dynamic Provider component provides up-to-date DNS information. In particular, when the DNS Information Dynamic Modifier component receives updated DNS information, the component would not only update the appropriate database records to include the updated DNS information, but would also modify the Update file so that it indicates that the updated DNS information is available (e.g., by including a unique identifier for each database record that has been updated). The DNS Information Dynamic Provider component would then check the Update file to determine whether cached DNS information needs to be updated, and would perform the corresponding update for some or all of the entries in the Update file by reading the stored DNS information in the indicated database record and replacing the previously cached information (not shown) that corresponds to the DNS information with the newly read DNS information. In this manner, the cached DNS information will be updated to match the updated stored DNS information. Those skilled in the art will appreciate that an Update file or other update data structure can be used in a similar manner with other types of storage mechanisms and other types of information.

Figure 4:
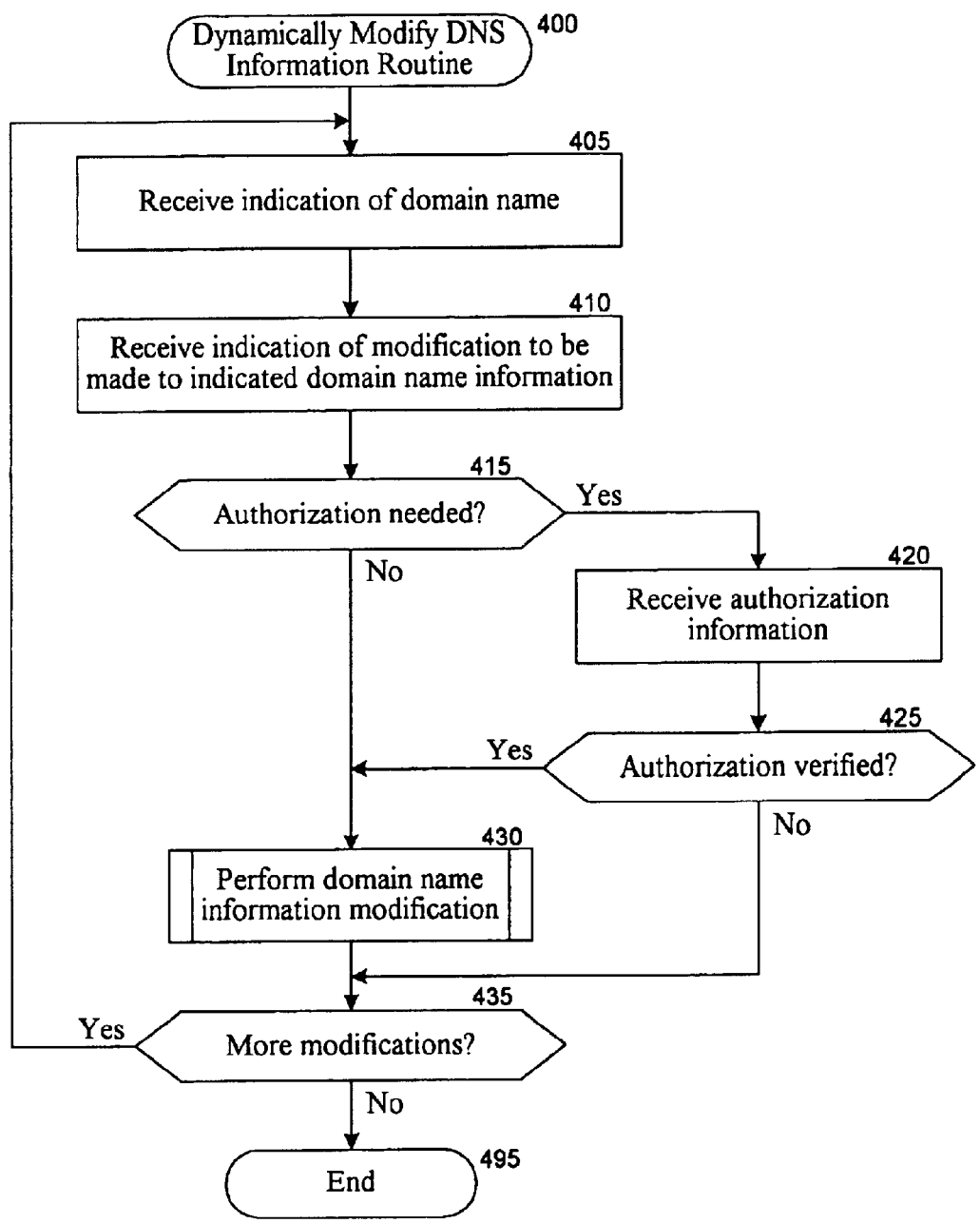
FIG. 4 is a flow diagram of an embodiment of the Dynamically Modify DNS Information routine.

FIG. 4 is a flow diagram of an embodiment of the Dynamically Modify DNS Information routine 400. The routine-receives an indication of DNS information to be modified, verifies that the requester has the appropriate authorization to make the modification, and if so performs the modification. The routine begins at step 405 where it receives an indication of specific DNS information or of a domain name whose associated DNS information is to be modified. The routine continues to step 410 where it receives an indication of a modification to be made to the indicated DNS information. In step 415, the routine then determines if authorization is needed to perform the modification, and if so continues to step 420 to receive authorization information. Those skilled in the art will appreciate that authorization information can be provided in a variety of ways, such as a confirmation of the identity of an authorized user or access information such as a password or digital certificate. After step 420, the routine determines in step 425 whether the authorization information was verified as sufficient. If so, or if no authorization was needed in step 415, the routine continues to execute subroutine 430 to perform the domain name information modification. After step 430, or if the authorization was not verified in step 425, the routine continues to step 435 to determine if more modifications are to be made. If so, the routine returns to step 405, and if not the routine continues to step 495 and ends.

Figure 5A:
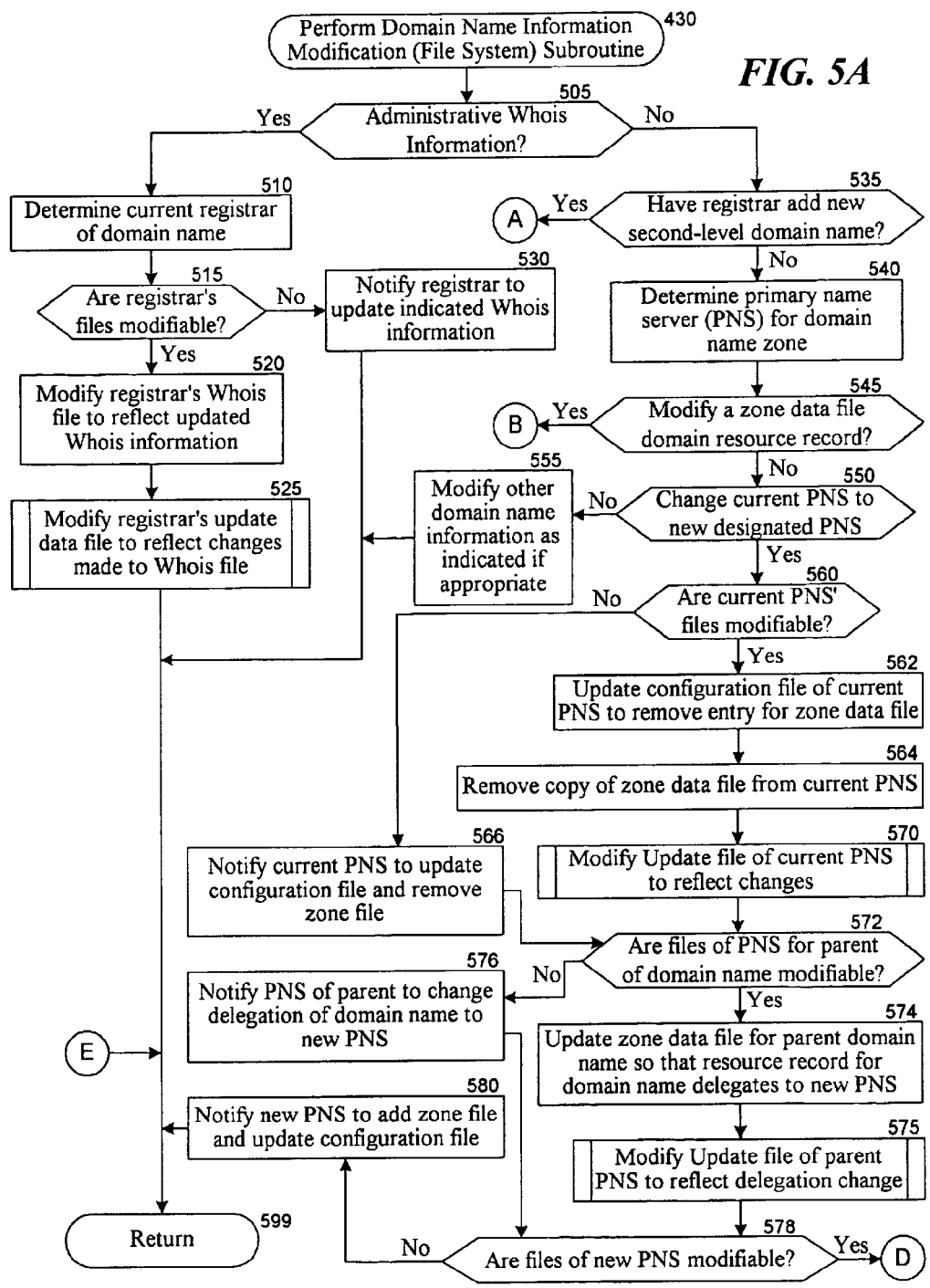
FIGS. 5A and 5B are a flow diagram of an embodiment of the Perform Domain Name Information Modification subroutine.
Figure 5B:
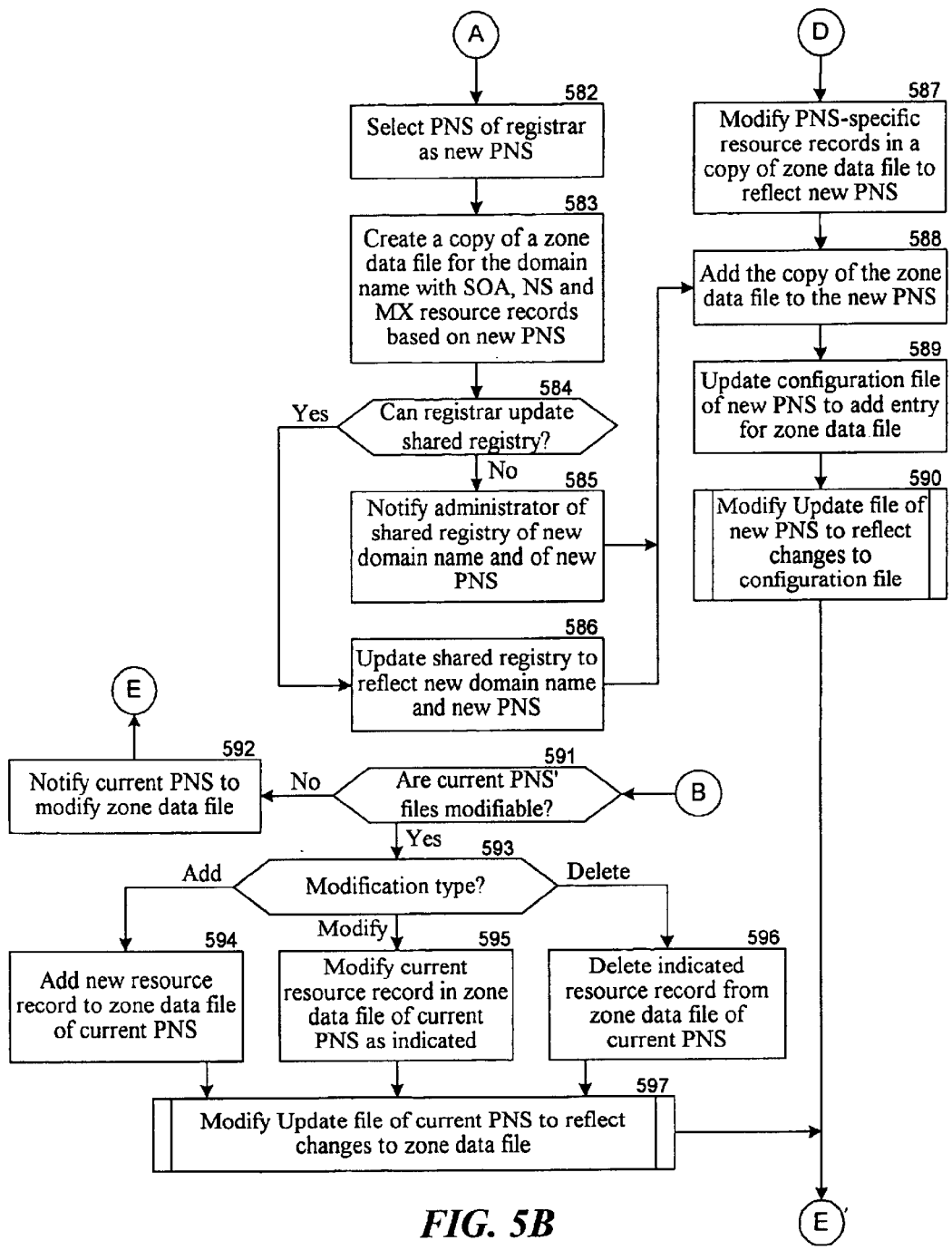

FIGS. 5A and 5B are a flow diagram of an embodiment of the Perform Domain Name Information Modification subroutine 430. This illustrated embodiment of the subroutine is used in situations where DNS information is stored in files. The subroutine receives an indication of the DNS information to be updated and of the modification to be made, determines the location where the DNS information is stored, updates the stored DNS information, and modifies a Update file to indicate the updated DNS information.

The subroutine begins in step 505 where it determines whether the DNS information to be modified is administrative whois information. If so, the subroutine continues to step 510 where it determines the current registrar that has control over the whois information and the location of the registrar's computer. In step 515, the subroutine determines whether the registrar's files are dynamically modifiable (e.g., by dynamically checking with the registrar's computer or by consulting a list of registrars with modifiable files). For example, if the subroutine is executed by a computer under the control of the registrar, it is likely that the computer will be able to modify the files, but if the computer is not under the control of the registrar then such dynamic modifications may not be allowed. If the registrar's files are not dynamically modifiable, the subroutine continues to step 530 to notify the registrar to update the whois information as indicated (e.g., via email). If it is instead determined that the registrar's files are dynamically modifiable, the subroutine continues to step 520 to modify the appropriate whois file so that it includes the updated whois information. The subroutine then continues to step 525 to execute the subroutine for modifying the registrar's Update file to indicate the updated DNS whois information. After steps 530 or 525, the subroutine continues to step 599 and returns.

If it was instead determined in step 505 that the indicated DNS information is not whois information, the subroutine continues to step 535 to determine whether the indicated modification is to have a registrar add a new second-level domain name (e.g., MicronPC.com). If so, the subroutine continues to step 582 where it selects the primary name server computer of the registrar as the new primary name server for the zone that will contain the new domain name. In the illustrated embodiment, a new zone data file will be created to hold the information for the new domain. In this embodiment, an assumption is also made that the registrar will provide a computer to act as the primary name server for the new domain name, and that the registrar will allow the appropriate files to be modified to add the DNS information for the new domain name. In alternate embodiments, the indicated DNS information may include various information such as an identification of a primary name server for the new domain or other DNS information to be associated with the new domain.

In step 583, the subroutine next creates a copy of the zone data file for the new domain name that includes SOA, NS and MX domain resource records that reflect the information for the new primary name server (e.g., the IP address of the new primary name server). Those skilled in the art will appreciate that in other embodiments, other domain resource records could be created. The subroutine then continues to step 584 to determine if the registrar can dynamically update the shared registry for the top-level domains. If so, the subroutine continues to step 586 to update the shared registry to reflect the new domain name and new primary name server (e.g., by adding a delegation record indicating the registrar's primary name'server computer), and if not the subroutine continues to step 585 to notify the administrator of the shared registry to make the appropriate changes. After steps 585 or 586, the subroutine continues to step 588 to update the appropriate DNS information on the new primary name server.

If it was instead determined in step 535 that the indicated DNS information modification is not to add a new domain name, the subroutine continues to step 540 to determine the primary name server for the zone that contains the domain name whose DNS information is to be modified. The subroutine then continues to step 545 to determine if the modification to be made is to modify a domain resource record in an existing zone data file. If so, the routine continues to step 591 to determine if the current files of the primary name server are dynamically modifiable. If not, the subroutine continues to step 592 to notify the primary name server to modify the zone data file as indicated, and then continues to step 599. If the files of the current primary name server are dynamically modifiable, however, the subroutine continues to step 593 to determine the type of modification to be made. If a new domain resource record is being added, the subroutine continues to step 594 to add the new resource record to the zone data file. If the modification is to change an existing domain resource record, the subroutine continues to step 595 to modify the current resource record as indicated. If the modification is instead to delete an existing domain resource record, the subroutine continues to step 596 to delete the indicated resource record from the zone data file. After steps 594, 595, or 596, the subroutine continues to step 597 to execute the subroutine to modify the Update file of the current primary name server to reflect the changes made to the zone data file. After step 597, the subroutine continues to step 599.

If it was instead determined in step 545 that the DNS information update is not to modify a domain resource record, the subroutine continues to step 550 to determine if the update is to change the current primary name server for the domain name to be a new designated primary name server. If not, the subroutine continues to step 555 to modify the other specified domain name information as indicated if appropriate. After step 555, the subroutine continues to step 599. If the modification is to change the current primary name server, however, the subroutine continues to step 560 to determine if the files of the current primary name server are dynamically modifiable. If not, the subroutine continues to 566 to notify the current primary name server to update the configuration file to remove the entry for the zone data file corresponding to the domain name being moved and also to remove the zone data file. If the files are dynamically modifiable, however, the subroutine continues to step 562 to update the configuration file of the current primary name server to remove the entry for the zone data file. The subroutine then continues to step 564 to remove the copy of the zone data file from the primary name server. In step 570, the subroutine to modify the Update file of the current primary name server to reflect the changes made is executed.

After steps 570 or 566, the subroutine continues to step 572 to determine if the files of the primary name server for the next higher-level parent domain name of the domain name being modified are dynamically modifiable (e.g., for the MicronPC.com domain name, the primary name server for the .com domain). If so, the subroutine continues to step 574 to update the zone data file for the parent domain name so that the delegation resource record for the domain name being modified will now delegate requests to the new primary name server. The subroutine then continues to step 575 to execute the subroutine to modify the Update file of the primary name server for the parent to reflect the changes made to the delegation resource record. If it was instead determined that the files of the primary name server for the parent of the domain name are not dynamically modifiable, the subroutine instead continues to step 576 to notify the primary name server to change the delegation of the domain name to the new primary name server.

After steps 576 or 575, the subroutine continues to step 578 to determine if the files of the new primary name server are dynamically modifiable. If not, the subroutine continues to step 580 to notify the new primary name server to add the previous zone data file for the new domain name and to update the zone data file as necessary to reflect the new primary name server, as well as to update the configuration file to reflect the new zone data file. After step 580, the subroutine continues to step 599. If it is instead determined that the files of the new primary name server are dynamically modifiable, the subroutine continues to step 587 to modify the resource records in a copy of the zone data file that are specific to the old primary name server so that those resource records now include the appropriate information for the new primary name server. The subroutine next adds the copy of the modified zone data file to the new primary name server in step 588. In step 589, the subroutine then updates the configuration file of the new primary name server to add an entry for the new zone data file. In step 590, the subroutine next executes the subroutine to modify the Update file of the new primary name server to reflect the changes made to the configuration file. After step 590, the subroutine continues to step 599 and returns.

Those skilled in the art will appreciate that any time a modification is made to the DNS information for a primary name server, it may also be appropriate to update the information that corresponding slave name servers have. In some embodiments, the responsibility for this updating may be left to the primary name servers being modified, while in other embodiments the illustrated routines could notify the slave name servers to request new DNS information from the primary name server or could instead send the updated DNS information to the slave name servers. In addition, those skilled in the art will appreciate that an update data structure other than an update file could be used.

Figure 6:
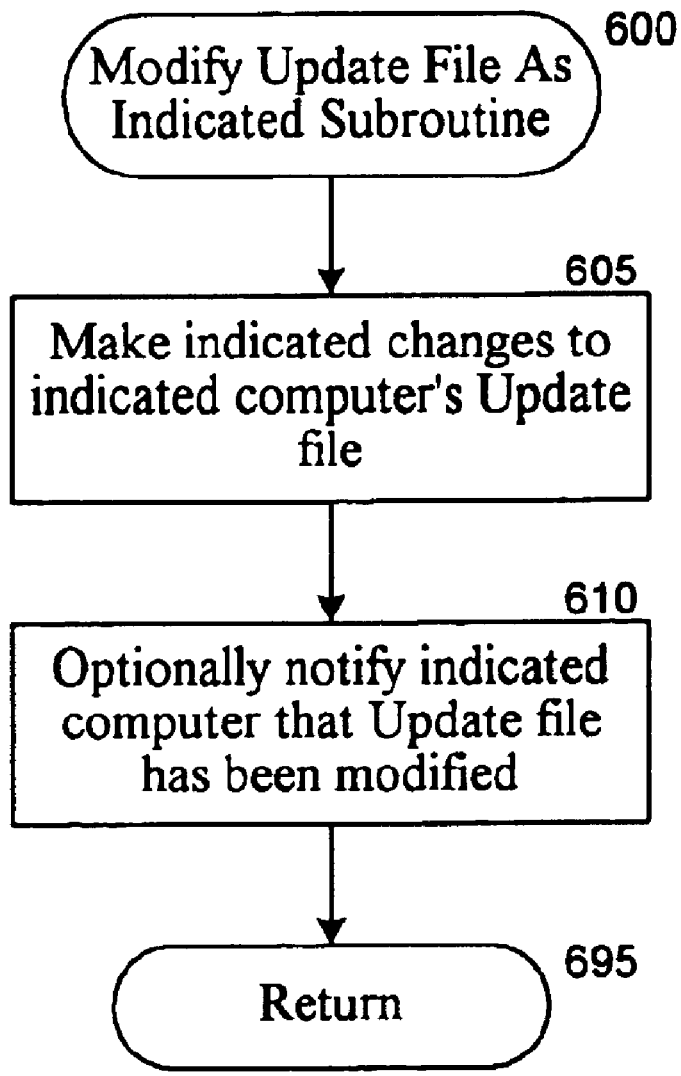
FIG. 6 is a flow diagram of an embodiment of the Modify Update File As Indicated subroutine.

FIG. 6 is a flow diagram of an embodiment of the Modify Update File As Indicated subroutine 600. The subroutine begins in step 605 where it receives indications of changes to be made to the indicated Update file on an indicated computer, and proceeds to make the indicated changes. The subroutine then optionally continues to step 610 to send a notification to the indicated computer (e.g., to the Dynamic DNS Information Modifier routine on the computer) that the Update file has been modified. The subroutine then continues to step 695 and returns. Those skilled in the art will appreciate that an update data structure other than an update file could be used.

Figure 7A:
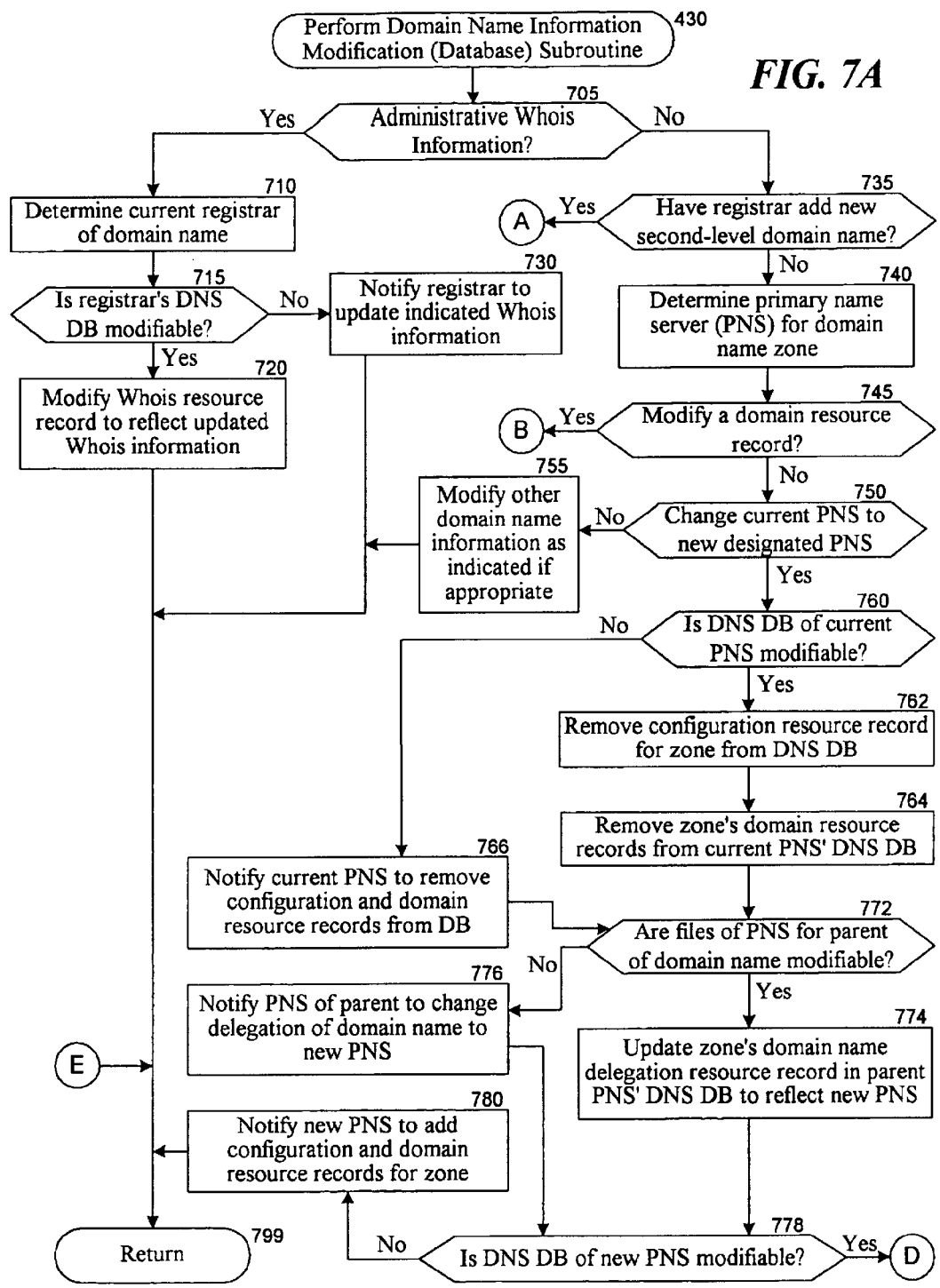
FIGS. 7A and 7B are a flow diagram of an embodiment of the Perform Domain Name Information Modification subroutine.
Figure 7B:
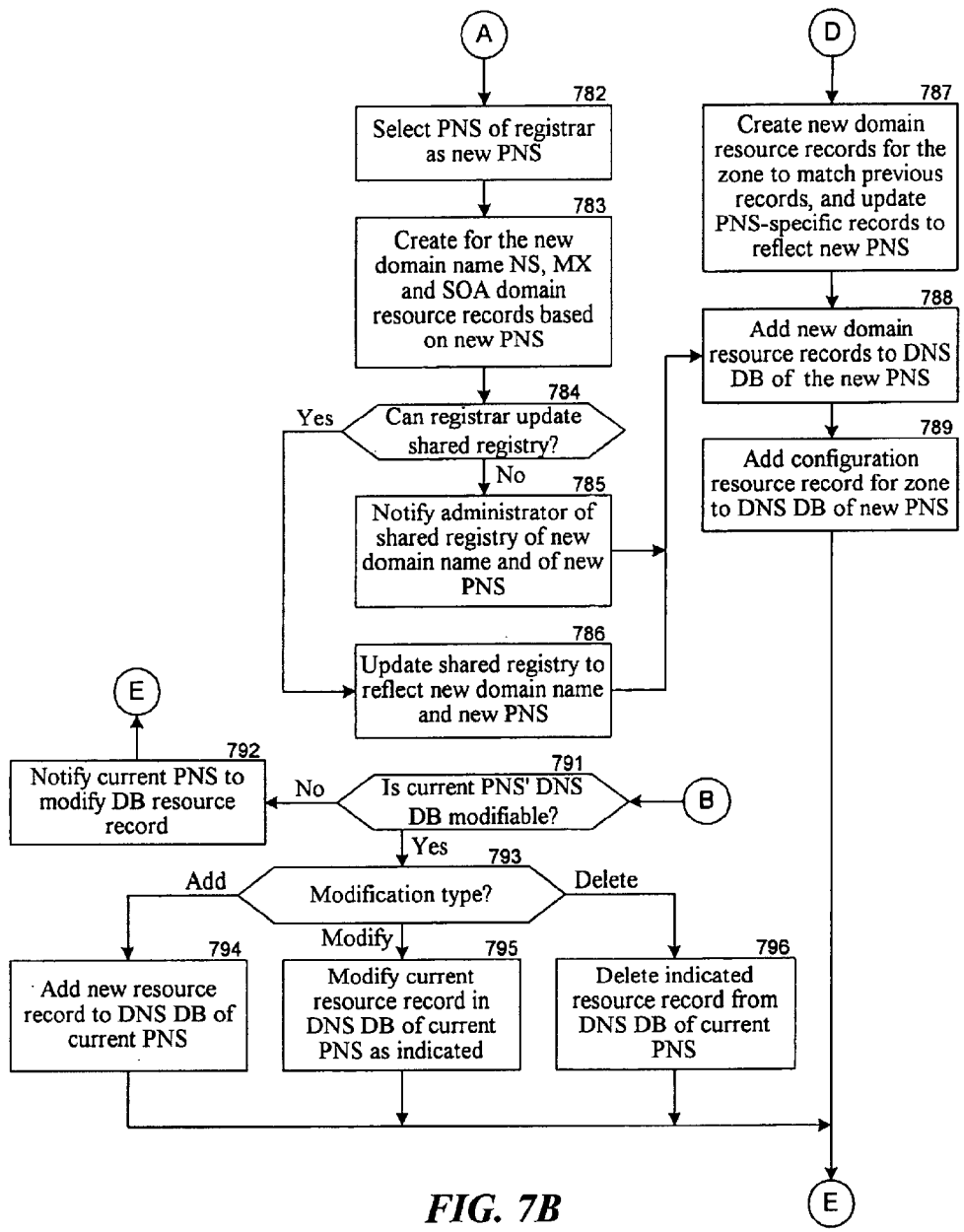

FIGS. 7A and 7B are a flow diagram of an alternate embodiment of the Perform Domain Name Information Modification subroutine 430. In particular, this illustrated embodiment of the subroutine is used in situations where DNS information is stored in a database and the DNS information is not cached. Thus, the use of an Update file is not necessary in this embodiment. The subroutine receives an indication of the DNS information to be updated and of the modification to be made, determines the location of the database where the DNS information is stored, and updates the stored DNS information.

The subroutine begins in step 705 where it determines whether the DNS information to be modified is administrative whois information. If so, the subroutine continues to step 710 where it determines the current registrar that has control over the whois information and the registrar's computer that stored the information. In step 715, the subroutine determines whether the registrar's DNS information database is dynamically modifiable. For example, if the subroutine is executed by a computer under the control of the registrar, it is likely that the computer will be able to modify the database, but if the computer is not under the control of the registrar then such modifications may not be allowed. If the registrar's DNS information database is not dynamically modifiable, the subroutine continues to step 730 to notify the registrar to update the whois information as indicated (e.g., via email). If it is instead determined that the registrar's DNS information database is dynamically modifiable, the subroutine continues to step 720 to modify the appropriate whois database record so that it includes the updated whois information. After steps 730 or 720, the subroutine continues to step 799 and returns.

If it was instead determined in step 705 that the indicated DNS information is not whois information, the subroutine continues to step 735 to determine whether the indicated modification is to have a registrar add a new second-level domain name (e.g., MicronPC.com). If so, the subroutine continues to step 782 where it selects the primary name server computer of the registrar as the new primary name server for the zone that will contain the new domain name. In the illustrated embodiment, a new zone will be created to hold the information for the new domain, but the domain resource records for the zone will be stored in the DNS information database rather than in a zone data file. In this embodiment, an assumption is also made that the registrar will provide a computer to act as the primary name server for the new domain name, and that the registrar will allow the one or more appropriate DNS information databases to be modified to add the DNS information for the new domain name. In alternate embodiments, the indicated DNS information may include various information such as an identification of a primary name server for the new domain or other DNS information to be associated with the new domain.

In step 783, the subroutine next creates copies of SOA, NS and MX domain resource records for the new domain name that reflect the information for the new primary name server (e.g., the IP address of the new primary name server). Those skilled in the art will appreciate that in other embodiments, other domain resource records could be created. The subroutine then continues to step 784 to determine if the registrar can dynamically update the shared registry for the top-level domains. If so, the subroutine continues to step 786 to update the shared registry to reflect the new domain name and new primary name server, and if not the subroutine continues to step 785 to notify an administrator of the shared registry to make the appropriate changes. After steps 785 or 786, the subroutine continues to step 788 to update the appropriate DNS information on the new primary name server.

If it was instead determined in step 735 that the indicated DNS information modification is not to add a new domain name, the subroutine continues to step 740 to determine the primary name server for the zone containing the domain name whose DNS information is to be modified. The subroutine then continues to step 745 to determine if the modification to be made is to modify a domain resource record. If so, the routine continues to step 791 to determine if the current DNS information database of the primary name server is dynamically modifiable. If not, the subroutine continues to step 792 to notify the primary name server to modify the domain resource record as indicated, and then continues to step 799. If the DNS information database of the current primary name server is dynamically modifiable, however, the subroutine continues to step 793 to determine the type of modification to be made. If a new domain resource record is being added, the subroutine continues to step 794 to add the new resource record to the DNS information database. If the modification is to change an existing domain resource record, the subroutine continues to step 795 to modify the current resource record in the DNS information database as indicated. If the modification is instead to delete an existing domain resource record, the subroutine continues to step 796 to delete the indicated resource record from the DNS information database. After steps 794, 795, or 796, the subroutine continues to step 799.

If it was instead determined in step 745 that the DNS information update is not to modify a domain resource record, the subroutine continues to step 750 to determine if the update is to change the current primary name server for the domain name to a new designated primary name server. If not, the subroutine continues to step 755 to modify the other specified domain name information as indicated if appropriate. After step 755, the subroutine continues to step 799. If the modification is to change the current primary name server, however, the subroutine continues to step 760 to determine if the DNS information database of the current primary name server is dynamically modifiable. If not, the subroutine continues to 766 to notify the current primary name server to update the configuration records to remove the one or more records for the zone and also to remove the zone's domain resource records. If the DNS information database is dynamically modifiable, however, the subroutine continues to step 762 to remove the appropriate configuration records for the zone. The subroutine then continues to step 764 to remove the domain resource records for the zone from the DNS information database of the primary name server. Those skilled in the art will appreciate that in some embodiments configuration records may not be included in the DNS information database, and if so the steps of the routine can be modified to not attempt to modify stored configuration records.

After steps 764 or 766, the subroutine continues to step 772 to determine if the DNS information database of the primary name server for the higher-level parent of the domain name being modified is dynamically modifiable (e.g., for the MicronPC.com domain name, the primary name server for the .com domain). If so, the subroutine continues to step 774 to update the delegation record for the domain name being modified so that requests for information about the domain will be delegated to the new primary name server. If it was instead determined that the DNS information database of the primary name server for the parent of the domain name is not dynamically modifiable, the subroutine instead continues to step 776 to notify the primary name server to change the delegation of the domain name to the new primary name server.

After steps 776 or 774, the subroutine continues to step 778 to determine if the DNS information database of the new primary name server is dynamically modifiable. If not, the subroutine continues to step 780 to notify the new primary name server to add the configuration records and domain resource records for the new domain name. After step 780, the subroutine continues to step 799. If it is instead determined that the DNS information database of the new primary name server is dynamically modifiable, the subroutine continues to step 787 to create new domain resource records for the zone that match the previous domain resource records, and to update any domain resource records specific to the old primary name server to reflect the new primary name server. The subroutine next adds the new domain resource records to the DNS information database of the new primary name server in step 788. In step 789, the subroutine then adds one or more configuration records for the zone to the DNS information database of the new primary name server. After step 789, the subroutine continues to step 799 and returns.

Figure 8:
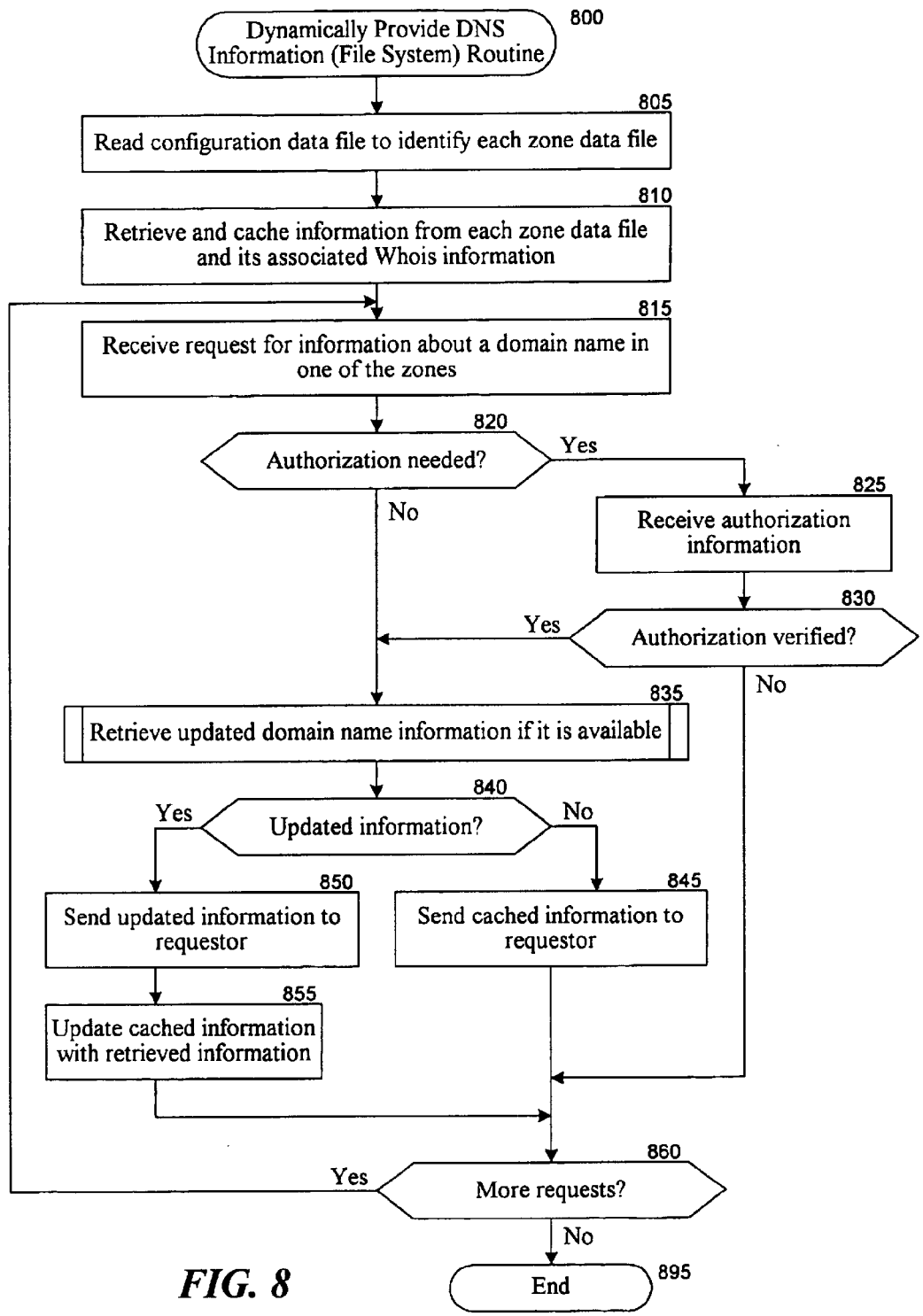
FIG. 8 is a flow diagram of an embodiment of the Dynamically Provide DNS Information routine.

FIG. 8 is a flow diagram of an embodiment of the Dynamically Provide DNS Information routine 800. This illustrated embodiment of the routine is used in situations where DNS information is stored in files. The routine reads and caches available DNS information, receives various requests for DNS information, verifies that the requestors are authorized if necessary, retrieves an up-to-date copy of the requested information by using an Update file, and provides the up-to-date DNS information to the requestor. In the illustrated embodiment, each time requested DNS information is to be provided, a check is made to determine if updated DNS information is available. Those skilled in the art will appreciate that in other embodiments the checks for updated DNS information can be made in other ways, such as when an instruction to perform a check is received from a user, on a periodic basis, or when a notification of updated DNS information being available is received.

The routine begins in step 805 where it reads the configuration data file to identify each available zone data file. The routine then continues to step 810 to retrieve and cache information from each zone data file, and to retrieve and cache whois information for each domain name. If the computer executing the routine is not both the whois computer and the primary name server computer, the computer may need to retrieve some information from another computer. The routine then continues to step 815 where it receives a request for information about a domain name. The routine continues to step 820 where it determines if authorization is needed to provide the information, and if so continues to step 825 to receive authorization information. After step 825, the routine determines in step 830 whether the authorization information was verified as sufficient. If so, or if no authorization was needed in step 820, the routine continues to execute subroutine 835 to retrieve an updated version of the requested DNS information if such information exists.

After step 835, the routine continues to step 840 to determine if it received updated DNS information. If not, the routine in step 845 sends the cached version of the requested DNS information to the requestor. If updated DNS information was received, however, the routine continues to step 850 to send the received updated DNS information to the requestor. In the illustrated embodiment, more information than the specific requested DNS information may be returned, and if so the routine will select the requested information that is to be sent. For example, if a single domain resource record in a zone data file is requested, and any domain resource record in that file had been updated, the entire contents of the zone data file would be returned. Alternately, the routine could receive an indication that cached DNS information is no longer available, and if so the routine sends an appropriate message (e.g., an error message) to the requestor. After step 850, the routine then continues to step 855 to replace the cached information corresponding to the received information with the received updated information, including removing cached information if it corresponds to DNS information that is no longer available. After steps 845 or 855, or if it was determined in step 830 that authorization was not verified, the routine continues to step 860 to determine if more requests for DNS information are to be received. If so, the routine returns to step 815, and if not the routine continues to step 895 and ends.

Figure 9:
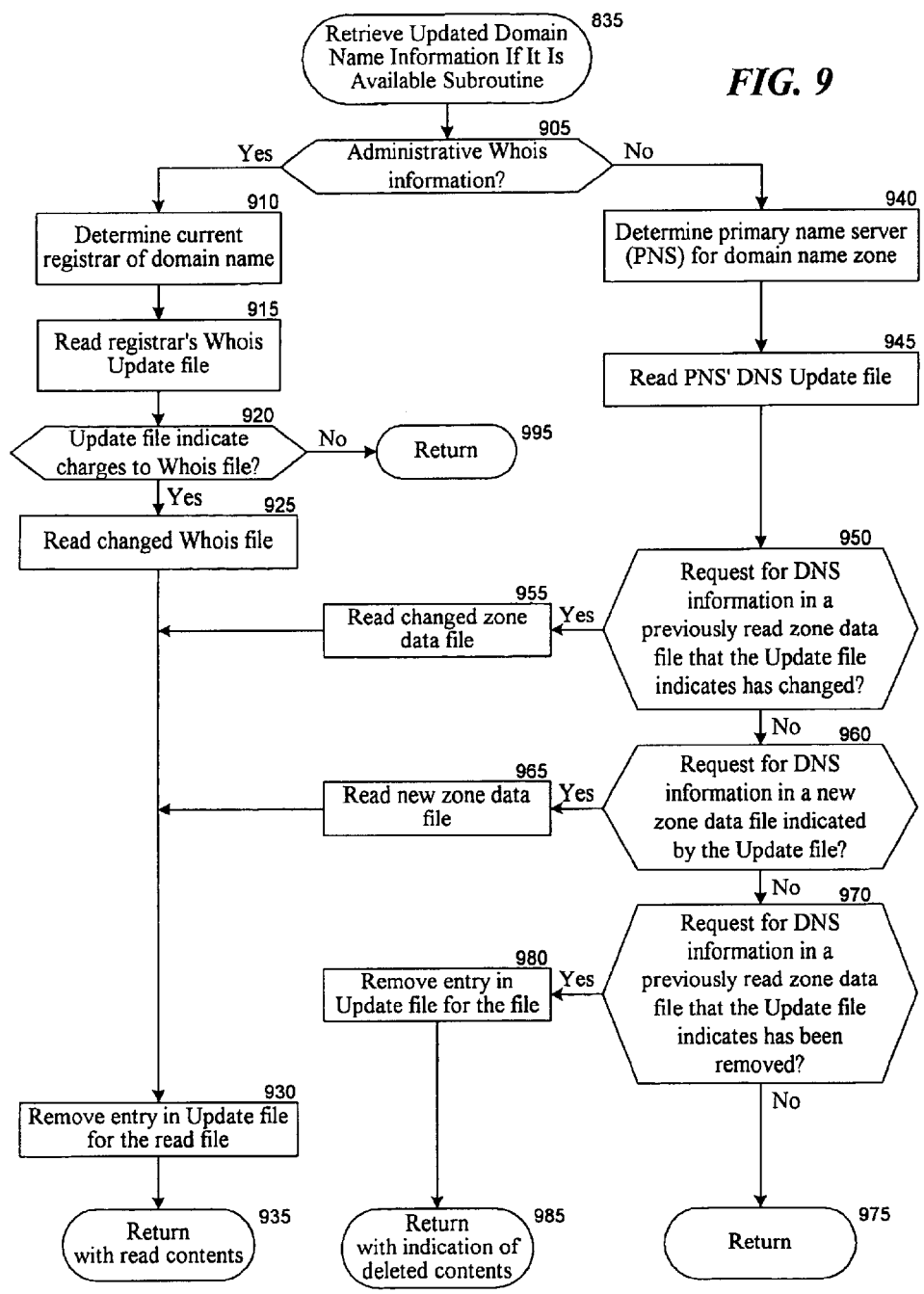
FIG. 9 is a flow diagram of an embodiment of the Retrieve Updated Domain Name Information If It Is Available subroutine.

FIG. 9 is a flow diagram of an embodiment of the Retrieve Updated Domain Name Information If It Is Available subroutine 835. The subroutine receives an indication of DNS information, determines if an updated version of the DNS information is available, and if so returns the updated DNS information. The subroutine begins in step 905 where it determines whether the DNS information is administrative whois information. If so, the subroutine continues to step 910 to determine the current registrar for the domain name. The subroutine then continues to step 915 to read the registrar's Update file that contains update information for the whois information. The subroutine continues to step 920 to determine if the Update file indicates that any whois information has been updated. If not, the subroutine continues to step 995 and returns without any information. If updated information is indicated, however, the subroutine continues to step 925 where it reads the contents of the whois data file with the updated information. The subroutine then continues to step 930 to remove the entry in the Update file for the whois file that was read, and then continues to step 935 to return with the contents of the read whois file. In embodiments in which the whois file contains information about multiple whois data entries, the subroutine could indicate the entry for the specific requested whois information entry (e.g., by placing it first), or instead the receiver of the information could extract the requested information from the returned information.

If it was instead determined in step 905 that the requested DNS information is not whois information, the subroutine continues to step 940 to determine the primary name server for the domain name's zone. The subroutine then continues to step 945 to read the Update file for the primary name server. In step 950, the subroutine then determines if the requested DNS information is in a zone data file that has been previously read and that the Update file indicates has changed. If so, the subroutine continues to step 955 to read the changed zone data file, and then continues to step 930. If the requested DNS information was not in a previously read zone data file that has changed, the subroutine continues to step 960 to determine if the Update file indicates that the requested DNS information is in a new zone data file that has not been previously read. If so, the subroutine continues to step 965 to read the new zone data file, and then continues to step 930. If it was instead determined that the requested DNS information is not in a new zone data file, the subroutine continues to step 970 to determine if the requested DNS information is in a previously read zone data file that the Update file indicates has been removed. If not, the subroutine continues to step 975 and returns without information. If so, however, the subroutine continues to step 980 to remove the entry in the Update file for the removed file, and then continues to step 985 to return with an indication of the deleted contents of the removed zone data file.

Figure 10:
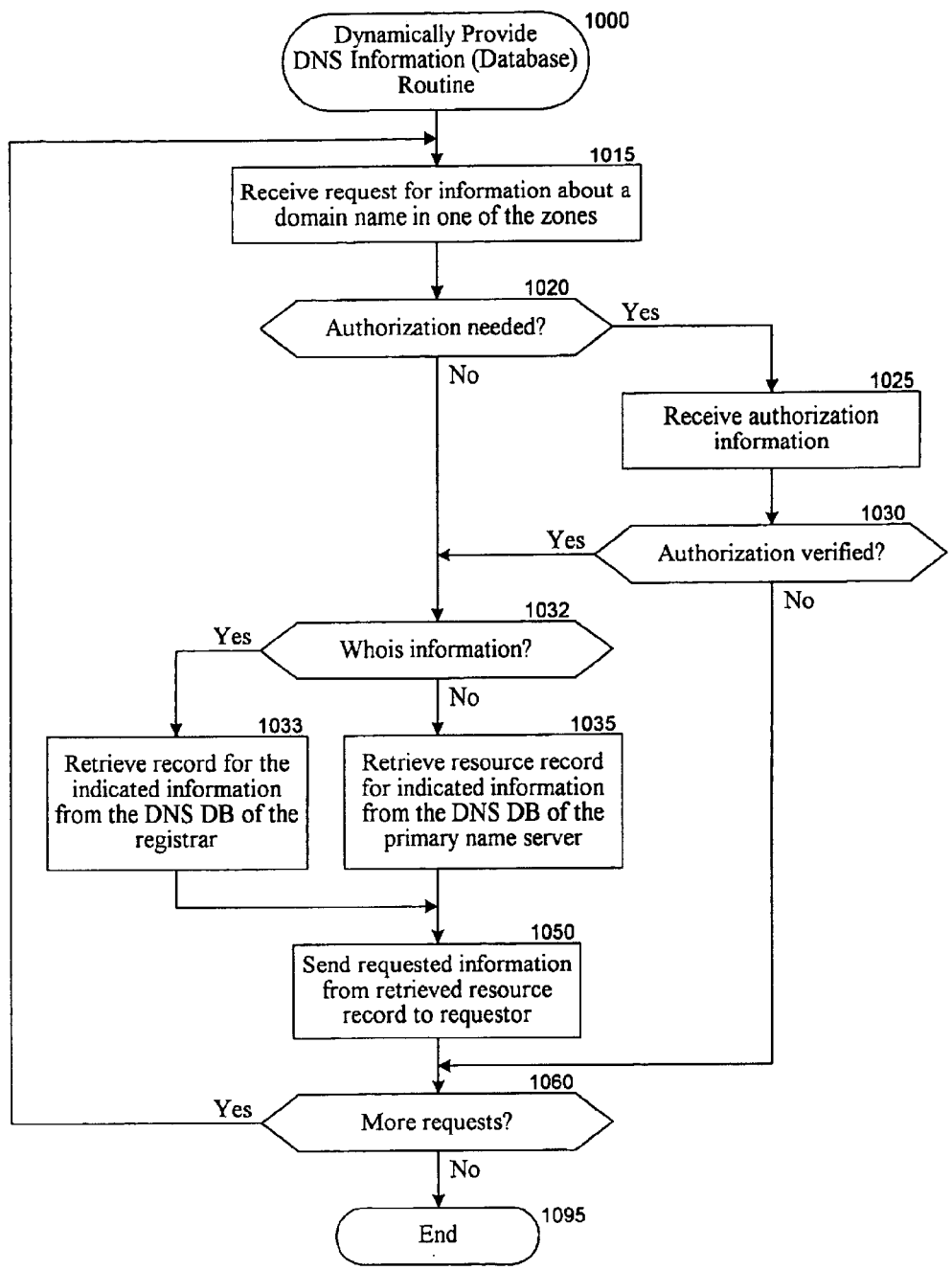
FIG. 10 is a flow diagram of an embodiment of the Dynamically Provide DNS Information routine.

FIG. 10 is a flow diagram of an alternate embodiment of the Dynamically Provide DNS Information routine 1000. This illustrated embodiment of the routine is used in situations where DNS information is stored in a DNS information database and the information from the database is not cached. The routine receives various requests for DNS information, verifies that the requesters are authorized if necessary, retrieves an up-to-date copy of the requested information from the DNS information database, and provides the up-to-date DNS information to the requester.

The routine begins in step 1015 where it receives a request for information about a domain name. The routine continues to step 1020 where it determines if authorization is needed to provide the information, and if so continues to step 1025 to receive authorization information. After step 1025, the routine determines in step 1030 whether the authorization information was verified as sufficient. If so, or if no authorization was needed in step 1020, the routine continues to step 1032 to determine if the requested information is whois information. If so, the routine continues to step 1035 to retrieve the appropriate whois database record from the DNS information database of the registrar for the domain name. If the requested information is not whois information, however, the routine instead continues to step 1035 to retrieve the database record for the requested DNS information from the DNS information database of the primary name server for the domain name. After steps 1033 or 1035, the routine continues to step 1050 to send the requested information from the retrieved database record to the requester. After step 1050, or if it was determined in step 1030 that authorization was not verified, the routine continues to step 1060 to determine if more requests for DNS information are to be received. If so, the routine returns to step 1015, and if not the routine continues to step 1095 and ends. Those skilled in the art will appreciate that if the database information was cached, the routine could be modified in a manner similar to that of the routine illustrated in FIG. 8 to include the use of an update file.

Figure 11:
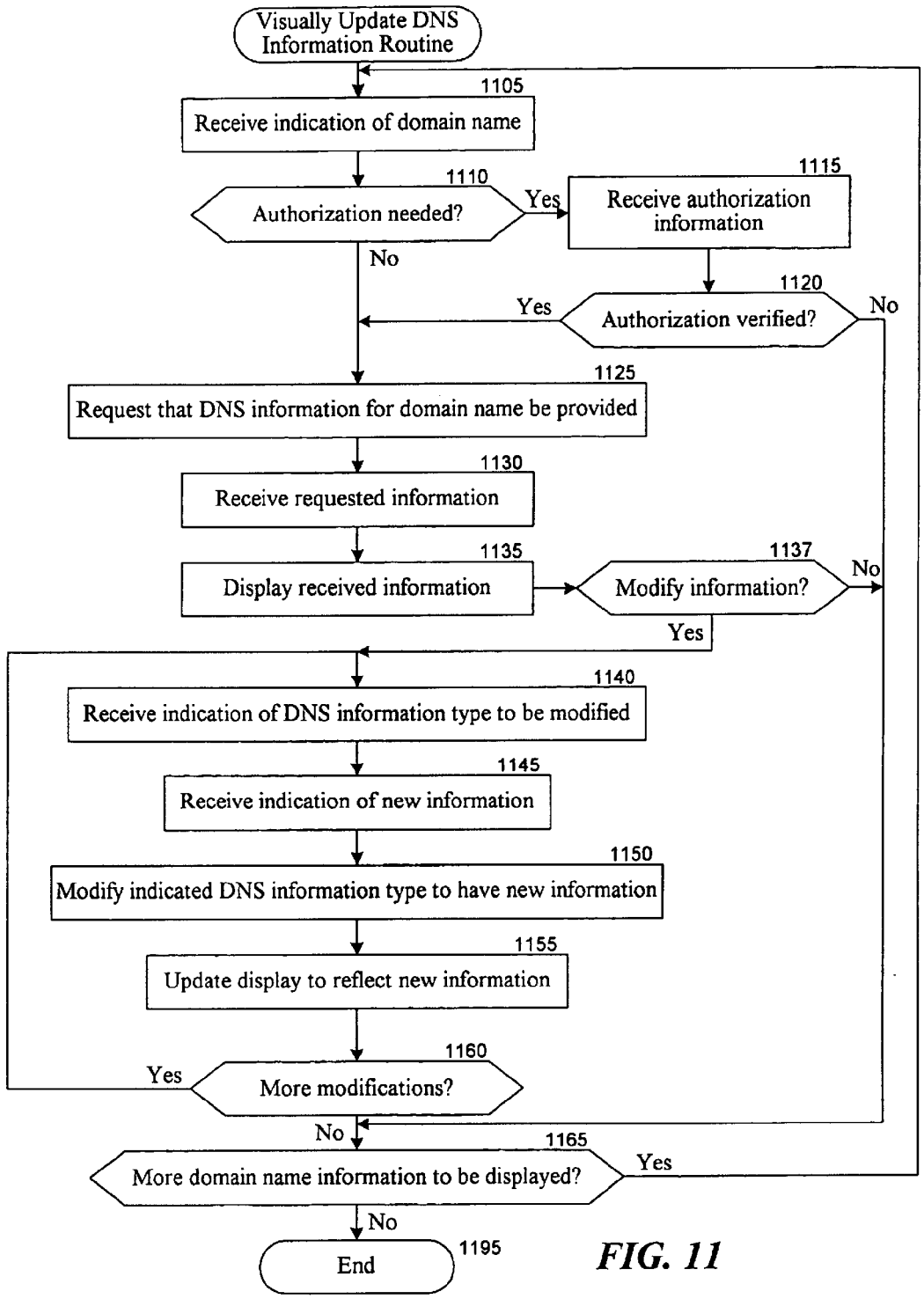
FIG. 11 is a flow diagram of an embodiment of the Visually Update DNS Information routine.

FIG. 11 is a flow diagram of an embodiment of the Visually Update DNS Information routine 1100. The routine receives requests to display DNS information from users, verifies that the requestors are authorized if necessary, retrieves an up-to-date copy of the requested information and displays the information to the user, receives changes to the displayed DNS information from the user, and dynamically modifies the information as indicated. The routine begins in step 1105 where it receives an indication of a domain name from a user. The routine then continues to step 1110 where it determines if authorization is needed to display the information or to allow the user to modify the information, and if so continues to step 1115 to receive authorization information. After step 1115, the routine determines in step 1120 whether the authorization information was verified as sufficient. If so, or if no authorization was determined to be needed in step 1110, the routine continues to step 1125 to request that up-to-date copies be provided of the various DNS information available for the indicated domain name, such as from the Dynamic DNS Information Provider component. The routine then continues to step 1130 where it receives the requested information, and in step 1135 displays the received information to the user in a graphical user interface (e.g., in a Web page displayed in a browser).

After displaying the information, the routine continues to step 1137 to determine whether the user desires to modify any of the DNS information. If so, the routine continues to step 1140 where it receives an indication from the user of a type of DNS information to be modified, such as by the user visually indicating displayed information in the GUI or indicating new DNS information to be added. The routine then continues to step 1145 where it receives an indication from the user of new information for the indicated type of DNS information, such as a new value for an existing displayed DNS information entry or a value for a new piece of DNS information being added. The routine then continues to step 1150 to update the DNS information for the domain name to include the updated DNS information, such as by sending the updated DNS information to the Dynamic DNS Information Modifier component. The routine then continues to step 1155 to update the displayed information to reflect the new information. The routine next continues to step 1160 to determine if more modifications are to made to the displayed DNS information. If so, the routine returns to step 1140. If not, or if it was determined in step 1120 that the authorization information was not verified or in step 1137 that the displayed DNS information is not to be modified, the routine continues to step 1165 to determine if more domain name information is to be displayed. If so, the routine returns to step 1105, and if not the routine continues to step 1195 and ends.

Those skilled in the art will appreciate that in some embodiments the routine could additionally provide information to users about services that could be provided to the users, such as the ability to register new domain names. In addition, the routine could retrieve payment information from users if such payments are required for making updates to DNS information or for providing a requested service to the user. In addition, in some embodiments the routine will merely provide information to the user in a displayable form (e.g., a Web page or other document) and the device used by the user will display the information (e.g., via standard software for displaying information such as a Web browser). In other embodiments, a portion of a DNS Information Visual Updater component could execute on the user's device in order to display the information to the user. In addition, in some embodiments the information can be presented to the user in a non-visual manner depending on the capabilities of the user's device, such as audibly.

As mentioned above, the techniques of the invention can be used in a wide variety of situations other than updating of DNS information. For example, in some situations source code that is being developed is stored in multiple portions (e.g., multiple files), with various dependencies between the portions affecting which portions need to be recompiled if a specific portion is modified. If so, the use of an Update file could be used to easily determine if any of the source code portions have been updated. Those skilled in the art will appreciate that the Update file could similarly be used in any other situation in which generated or other information is affected if other information is modified, such as a file that includes some or all of the contents of another file, a piece of information in a spreadsheet that is calculated based on other pieces of information, information produced by one or more rules in a rule-based system, etc.

From the foregoing it will be appreciated that, although specific embodiments have been described herein for purposes of illustration, various modifications may be made without deviating from the spirit and scope of the invention. Accordingly, the invention is not limited except as by the appended claims.

I claim:

1. A method for a name server computer to dynamically update Domain Name System (DNS) resource records (RRs) that each contain mapping information associating a domain name with an Internet Protocol (IP) address, the mapping information for each DNS RR stored in one of multiple zone data files on a hard drive and in active use, the dynamic updating using an update file distinct from the zone data files to determine if any of the stored zone data files have updated DNS information without having to read or check each of the files, the method comprising:

reading the mapping information for each of the DNS RRs from each of the multiple stored zone data files, and caching the read mapping information in temporary memory for use in responding to requests for mapping information;

repeatedly receiving requests from clients for mapping information for an indicated one of the DNS RRs, and in response to each request sending the cached mapping information for the indicated DNS RR to the requesting client;

receiving an indication of a change to the mapping information for a first of the DNS RRs;

determining that the mapping information for the first DNS RR is in a first stored zone data file, and updating the first stored zone data file so that the first DNS RR contains the changed mapping information;

modifying the update file to indicate that the first stored zone data file has been updated; and before sending the mapping information for the first DNS RR to a client, reading the modified update file to determine that the first stored zone data file has been updated; and upon determining that the first stored zone data file has been updated, reading the changed mapping information for the first DNS RR from the updated first stored zone data file and replacing the previously cached mapping information for the first DNS RR with the read changed mapping information, so that the mapping information for the first DNS RR is dynamically updated after a change such that the next request for first DNS RR information will receive the changed information.

2. The method of claim 1 wherein the name server computer is the primary name server for the first DNS RR.

3. The method of claim 1 including:

determining that all of the mapping information is to be reread; and rereading the mapping information for each of the DNS RRs from each of the multiple stored zone data files, and replacing the cached mapping information read from each of the DNS RRs with the read mapping information from that DNS RR.

4. The method of claim 3 wherein the rereading of the mapping information occurs after the modifying of the update file and before the reading of the modified update file, and including modifying the update file so that it does not indicate that the first stored zone data file has been updated.

5. The method of claim 1 including, after the replacing of the previously cached mapping information for the first DNS RR with the read changed mapping information, modifying the update file so that it does not indicate that the first stored zone data file has been updated.

6. The method of claim 1 wherein there are thousands of zone data files.

7. The method of claim 1 including checking the update file on a periodic basis to determine if any stored zone data files have been updated.

8. The method of claim 1 including performing the dynamic updating for types of stored DNS information that are cached in memory other than the DNS RRs.

9. A computer-implemented method for dynamically updating Domain Name System (DNS) information that is stored in one or more data files and is cached in memory, the dynamic updating performed using a update file distinct from the stored data files to determine if any of the stored data files have updated DNS information, the method comprising:

after the stored DNS information from the data files has been cached in memory,
receiving multiple requests from clients for DNS information; and
in response to each received request, sending corresponding cached DNS information to the requesting client; and
after the stored DNS information in the data files is updated but the cached DNS information has not been updated,
receiving a request from a first client for the DNS information;
determining that the update file indicates that the stored DNS information has changed to include updated DNS information;
in response to the determining, retrieving the updated DNS information;
caching the retrieved updated DNS information; and
sending the retrieved updated DNS information to the first client.

10. The method of claim 9 wherein the method is performed by a primary name server computer for the stored DNS information, and including, after the retrieving of the updated DNS information, sending the retrieved updated DNS information to each slave name server computer for the stored DNS information.

11. The method of claim 9 including:
periodically determining that all of the cached DNS information is to be replaced with a current version of the DNS information in the stored data files; and
after the determining, retrieving the DNS information from each of the stored data files and replacing the cached DNS information corresponding to each stored data file with the retrieved DNS information from that stored data file.

12. The method of claim 11 including modifying the update file after the determining so that it does not indicate that any stored DNS information has changed.

13. The method of claim 9 including:
receiving an indication from a user to replace all of the cached DNS information with a current version of the DNS information in the stored data files; and
retrieving the DNS information from each of the stored data files and replacing the cached DNS information corresponding to each stored data file with the retrieved DNS information from that stored data file.

14. The method of claim 9 including, after the retrieving of the updated DNS information, modifying the update file so that it does not indicate that any stored DNS information has changed.

15. The method of claim 9 wherein the determining that the update file indicates that the stored DNS information has changed is based on an indication from a user to change the stored DNS information in a specified manner.

16. The method of claim 9 wherein the determining that the update file indicates that the stored DNS information has changed is based on the existence of the update file.

17. The method of claim 9 wherein the determining that the update file indicates that the stored DNS information has changed is based on a most recent modification time of the update file.

18. The method of claim 9 wherein the determining that the update file indicates that the stored DNS information has changed is based on periodic checking of the update file.

19. The method of claim 9 wherein the determining that the update file indicates that the stored DNS information has changed is based on modifying of the update file that is performed after updated DNS information is received.

20. The method of claim 19 including receiving the updated DNS information and performing the modifying of the update file in response.

21. The method of claim 19 wherein the modifying of the update file includes creating the update file.

22. The method of claim 9 wherein the update file indicates that the stored DNS information has changed by indicating one or more stored data files that include the updated stored DNS information.

23. The method of claim 9 wherein the update file indicates that the stored DNS information has changed by including the updated DNS information, and wherein the retrieving of the updated DNS information retrieves the updated DNS information from the update file.

24. The method of claim 9 wherein multiple update files are used to indicate that the stored DNS information has changed.

25. The method of claim 9 wherein the updated DNS information is a modification of previously stored DNS information.

26. The method of claim 9 wherein the updated DNS information is a deletion of previously stored DNS information, and wherein the retrieving and caching of the updated DNS information includes removing references to the previously stored DNS information.

27. The method of claim 9 wherein the updated DNS information is new DNS information.

28. The method of claim 27 wherein the method is performed by a computer under control of a registrar, and wherein the updated DNS information relates to a new domain name.

29. The method of claim 9 wherein at least portions of the method are performed by an executing copy of Berkeley Internet Name Domain ("BIND") software.

30. The method of claim 9 wherein there are thousands of stored data files.

31. The method of claim 9 wherein the stored DNS information includes DNS resource records.

32. The method of claim 9 wherein the stored DNS information includes DNS configuration records.

33. The method of claim 9 wherein the stored DNS information includes DNS whois records.

34. The method of claim 9 wherein the stored DNS information includes DNS delegation records.

35. A computer-readable medium whose contents cause a computer system to dynamically update Domain Name System (DNS) information that is stored in one or more data files and is cached in memory, the dynamic updating performed using a update file distinct from the stored data files to determine if any of the stored data files have updated DNS information, by:

after the stored DNS information from the data files has been cached in memory, receiving multiple requests from clients for the DNS information; and in response to each received request, sending the cached DNS information to the requesting client; and after the stored DNS information in the data files is updated but the cached DNS information has not been updated, receiving a request from a first client for the DNS information;

determining that the update file indicates that the stored DNS information has changed to include updated DNS information;

in response to the determining, retrieving the updated DNS information;

caching the retrieved updated DNS information; and sending the retrieved updated DNS information to the first client.

36. The computer-readable medium of claim 35 wherein the contents further cause:

receiving an indication from a user to replace all of the cached DNS information with a current version of the DNS information in the stored data files; and retrieving the DNS information from each of the stored data files and replacing the cached DNS information corresponding to each stored data file with the retrieved DNS information from that stored data file.

37. The computer-readable medium of claim 35 wherein the determining that the update file indicates that the stored DNS information has changed is based on an indication from a user to change the stored DNS information in a specified manner.

38. The computer-readable medium of claim 35 wherein the stored DNS information includes DNS resource records.

39. The computer-readable medium of claim 35 wherein the computer-readable medium is a data transmission medium transmitting a generated data signal containing the contents.

40. The computer-readable medium of claim 35 wherein the computer-readable medium is a memory of a computer.

41. A computing device for dynamically updating Domain Name System (DNS) information that is stored in one or more data files and is cached in memory, the dynamic updating performed using a update file distinct from the stored data files to determine if any of the stored data files have updated DNS information, comprising:

a memory capable of containing cached DNS information; and a DNS information dynamic modifier component capable of, after the stored DNS information in the data files is updated but the cached DNS information has not been updated, determining that the update file indicates that the stored DNS information has changed to include updated DNS information, retrieving the updated DNS information in response to the determining, and caching the retrieved updated DNS information.

42. The computing device of claim 41 wherein the DNS information dynamic modifier component is executing in the memory of the computing device.

43. The computing device of claim 41 including:

a DNS information dynamic provider component capable of receiving multiple requests from clients for DNS information and sending corresponding cached DNS information to the requesting client in response to each received request, and of, after the retrieving of the updated DNS information, sending the retrieved updated DNS information to a client in response to a request for the DNS information.

44. The computing device of claim 41 including:

a hard disk capable of storing the data files.

45. A computing device for dynamically updating Domain Name System (DNS) information that is stored in one or more data files and is cached in memory, the dynamic updating performed using a update file distinct from the stored data files to determine if any of the stored data files have updated DNS information, comprising:

means for, after the stored DNS information from the data files has been cached in memory, receiving multiple requests from clients for DNS information; and in response to each received request, sending corresponding cached DNS information to the requesting client; and means for, after the stored DNS information in the data files is updated but the cached DNS information has not been updated, determining that the update file indicates that the stored DNS information has changed to include updated DNS information;

in response to the determining, retrieving the updated DNS information; and caching the retrieved updated DNS information.

46. A computer-implemented method for dynamically updating Domain Name System (DNS) information that is stored in multiple portions by a storage mechanism and that is cached, the dynamic updating performed using a update data structure that is distinct from storage information maintained by the storage mechanism so that a determination of whether the stored DNS information has been changed can be made without reading the stored DNS information portions or checking the storage information maintained by the storage mechanism, the update data structure consisting of multiple elements and having an element corresponding to each stored portion of DNS information, the method comprising:

receiving each stored portion of DNS information and caching the received DNS information portions;

receiving multiple indications of at least some of the DNS information;

in response to each received indication, providing at least one of the cached DNS information portions that corresponds to the indicated DNS information;

receiving an indication of a modification of the DNS information;

determining each stored DNS information portion that is changed by the modification;

for each determined stored DNS information portion, updating the element of the update data structure that corresponds to the determined stored DNS information portion to indicate that the corresponding stored DNS information portion has been changed; and before providing a first cached DNS information portion whose corresponding first stored DNS information portion has changed, determining that the update data structure element corresponding to the first stored DNS information portion indicates that the first stored DNS information portion has changed;

retrieving the changed first stored DNS information portion; and replacing the first cached DNS information portion with the retrieved first stored DNS information portion.

47. The method of claim 46 wherein each stored DNS information portion is a file.

48. The method of claim 46 wherein each stored DNS information portion is a database record.

49. The method of claim 46 wherein the updated structure is an update file.

50. The method of claim 46 wherein the storage information is information about a time of creation or of most recent modification of a stored DNS information portion.

51. The method of claim 46 wherein the determining that the update data structure element indicates that the first stored DNS information portion has changed is caused by receipt of an indication to update the cached DNS information portions that correspond to stored DNS information portions that have changed, and including:
   if an indication is received to update all of the cached DNS information portions,
      retrieving each stored portion of DNS information; and
      for each retrieved stored information portion, updating the cached DNS information portion corresponding to the stored DNS information portion to reflect the retrieved stored DNS information portion.

52. A computer-readable medium whose contents cause a computer system to dynamically update Domain Name System (DNS) information that is stored in multiple portions by a storage mechanism and that is cached, the dynamic updating performed using a update data structure that is distinct from storage information maintained by the storage mechanism so that a determination of whether the stored DNS information has been changed can be made without reading the stored DNS information portions or checking the storage information maintained by the storage mechanism, the update data structure consisting of multiple elements and having an element corresponding to each stored portion of DNS information, by:
   receiving each stored portion of DNS information and caching the received DNS information portions;
   receiving multiple indications of at least some of the DNS information;
   in response to each received indication, providing at least one of the cached DNS information portions that corresponds to the indicated DNS information;
   receiving an indication of a modification of the DNS information;
   determining each stored DNS information portion that is changed by the modification;
   for each determined stored DNS information portion, updating the element of the update data structure that corresponds to the determined stored DNS information portion to indicate that the corresponding stored DNS information portion has been changed; and
   before providing a first cached DNS information portion whose corresponding first stored DNS information portion has changed,
      determining that the update data structure element corresponding to the first stored DNS information portion indicates that the first stored DNS information portion has changed;
      retrieving the changed first stored DNS information portion; and
      replacing the first cached DNS information portion with the retrieved first stored DNS information portion.

53. A computing device for dynamically updating Domain Name System (DNS) information that is stored in multiple portions by a storage mechanism and that is cached, the dynamic updating performed using a update data structure that is distinct from storage information maintained by the storage mechanism so that a determination of whether the stored DNS information has been changed can be made without reading the stored DNS information portions or checking the storage information maintained by the storage mechanism, the update data structure consisting of multiple elements and having an element corresponding to each stored portion of DNS information, comprising:
   a memory capable of containing cached DNS information;
   a storage mechanism capable of storing multiple portions of DNS information; and
   a DNS information dynamic modifier component capable of receiving an indication of a modification of DNS information, of determining each stored DNS information portion that is changed by the modification, of updating the element of the update data structure that corresponds to each determined stored DNS information portion to indicate that the corresponding stored DNS information portion has been changed, and of, before providing a first cached DNS information portion whose corresponding first stored DNS information portion has changed, determining that the update data structure element corresponding to the first stored DNS information portion indicates that the first stored DNS information portion has changed, retrieving the changed first stored DNS information portion, and replacing the first cached DNS information portion with the retrieved first stored DNS information portion.

54. A computer-implemented method for dynamically updating generated information that is based on other portions of information stored by a storage mechanism, the dynamic updating performed using a update file so that a determination of whether any of the stored portions of information have changed can be made without reading the stored information portions or checking any storage information maintained by the storage mechanism, the method comprising:
   receiving an indication of a modification of at least one of the stored portions of information;
   for each modified stored information portion, modifying the update file to indicate that the stored information portion has been modified; and
   after the receiving of the indication of the modification but before providing the generated information,
      determining that the update file indicates that at least one of the stored information portions has been modified; and
      updating the generated information based on the modifications to the modified stored information portions.

55. The method of claim 54 wherein each stored information portion is a file.

56. The method of claim 55 wherein the stored files contain Domain Name System information.

57. The method of claim 55 wherein the stored files contain source code, and wherein the generated information is compiled code based on the source code.

58. The method of claim 54 wherein the stored information portions contain information used as inputs to the generating of the generated information.

59. A computer-readable medium whose contents cause a computer system to dynamically update generated information that is based on other portions of information stored by a storage mechanism, the dynamic updating performed using a update file so that a determination of whether any of the stored portions of information have changed can be made without reading the stored information portions or checking any storage information maintained by the storage mechanism, by:

receiving an indication of a modification of at least one of the stored portions of information;

for each modified stored information portion, modifying the update file to indicate that the stored information portion has been modified; and after the receiving of the indication of the modification but before providing the generated information, determining that the update file indicates that at least one of the stored information portions has been modified; and indicating to update the generated information based on the modifications to the modified stored information portions.

60. A computing device for dynamically updating generated information that is based on other portions of information stored by a storage mechanism, the dynamic updating performed using a update file so that a determination of whether any of the stored portions of information have changed can be made without reading the stored information portions or checking any storage information maintained by the storage mechanism, comprising:

a storage mechanism capable of storing multiple portions of information; and a dynamic information modifier component capable of receiving an indication of a modification of at least one of the stored portions of information, of modifying the update file to indicate that each modified stored information portion has been modified, and of, after the receiving of the indication of the modification but before providing the generated information, determining that the update file indicates that at least one of the stored information portions has been modified and indicating to update the generated information based on the modifications to the modified stored information portions.

61. A computer-implemented method for dynamically updating Domain Name System (DNS) information that is stored in multiple portions and is cached in memory, the dynamic updating performed using a update file to determine if any of the stored DNS information portions have been updated, the method comprising:

receiving each stored portion of DNS information and caching the received DNS information portions in memory;

receiving multiple indications of at least some of the DNS information;

in response to each received indication, providing at least one of the cached DNS information portions that corresponds, to the indicated DNS information;

receiving an indication of a modification of the DNS information;

determining each stored DNS information portion that is changed by the modification;

for each determined stored DNS information portion, modifying the update file to indicate that the stored DNS information portion has been changed;

if an indication is received to update the cached DNS information portions that correspond to stored DNS information portions that have changed, determining from the update file the stored DNS information portions that have changed; and for each determined stored information portion, retrieving the changed stored DNS information portion; and updating the cached DNS information portion corresponding to the stored DNS information portion to reflect the retrieved changed stored DNS information portion; and if an indication is received to update all of the cached DNS information portions, retrieving each stored portion of DNS information; and for each retrieved stored information portion, updating the cached DNS information portion corresponding to the stored DNS information portion to reflect the retrieved stored DNS information portion.

62. The method of claim 61 wherein the method is performed by an executing process, and wherein the received indication to update all of the cached DNS information portions is an instruction to the executing process to reload each stored DNS information portion.

63. The method of claim 61 wherein the method is performed by an executing process, and wherein the received indication to update all of the cached DNS information portions is an instruction to restart the process.

* * * * *